US008622190B2

(12) United States Patent
Lavanchy et al.

(10) Patent No.: US 8,622,190 B2
(45) **Date of Patent: *Jan. 7, 2014**

(54) COIN SENSOR

(71) Applicant: MEI, Inc., Malvern, PA (US)

(72) Inventors: David Lavanchy, Morges (CH); Gaston Baudat, Glenmoore, PA (US)

(73) Assignee: MEI, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/796,058

(22) Filed: Mar. 12, 2013

(65) Prior Publication Data

US 2013/0240322 A1 Sep. 19, 2013

Related U.S. Application Data

(60) Provisional application No. 61/610,918, filed on Mar. 14, 2012.

(51) Int. Cl.

| | |
|---|---|
| ***G07F 9/08*** | (2006.01) |
| ***G06F 7/00*** | (2006.01) |
| ***G06F 9/00*** | (2006.01) |
| ***G06F 19/00*** | (2011.01) |

(52) U.S. Cl.
USPC ............................ 194/317; 194/318; 194/320

(58) Field of Classification Search
USPC ................................ 194/317–320; 73/514.14
See application file for complete search history.

(56) References Cited

U.S. PATENT DOCUMENTS

| | | | | |
|---|---|---|---|---|
| 3,576,244 | A | 4/1971 | Ptacek et al. | |
| 4,254,857 | A | 3/1981 | Levasseur et al. | |
| 4,717,006 | A | 1/1988 | Chapman et al. | |
| 5,017,888 | A | 5/1991 | Meinzer | |
| 5,078,252 | A | 1/1992 | Furuya et al. | |
| 5,458,225 | A | 10/1995 | Iwamoto et al. | |
| 5,573,099 | A | 11/1996 | Church et al. | |
| 6,068,102 | A | 5/2000 | Kawase | |
| 6,325,197 | B1 | 12/2001 | Furuya | |
| 6,455,825 | B1 | 9/2002 | Bentley et al. | |
| 6,988,606 | B2 | 1/2006 | Geib et al. | |
| 7,108,120 | B2 | 9/2006 | Furuya | |
| 8,063,777 | B2 | 11/2011 | Candy | |
| 2004/0015459 | A1 | 1/2004 | Jaeger | |
| 2004/0084278 | A1 | 5/2004 | Harris et al. | |
| 2006/0151284 | A1 | 7/2006 | Howells | |
| 2009/0101469 | A1 * | 4/2009 | Baudat et al. | 194/317 |
| 2009/0315707 | A1 * | 12/2009 | Candy | 340/540 |

FOREIGN PATENT DOCUMENTS

| | | | |
|---|---|---|---|
| EP | 0489041 | B1 | 11/1995 |
| EP | 1589493 | A1 | 10/2005 |
| KR | 20020022433 | A | 3/2002 |

* cited by examiner

*Primary Examiner* — Jeffrey Shapiro
(74) *Attorney, Agent, or Firm* — Mintz Levin Cohn Ferris Glovsky and Popeo, P.C.

(57) ABSTRACT

A coin tester includes a coin sensor which outputs a measurement signal which is influenced by the presence of a coin. A memory device stores an impedence model of the coin sensor and the model representing an expected influence of a coin configuration model on the measurement signal. A processor computes and applies acceptance criteria to determine whether the coin falls within a predetermined coin configuration.

38 Claims, 22 Drawing Sheets

COIN SENSOR

RELATED APPLICATIONS

This application claims priority to U.S. Application Ser. No. 61/610,918 filed Mar. 14, 2012, the entirety of which is herein incorporated by reference.

FIELD OF DISCLOSURE

This disclosure relates to apparatus and methods of sensing metal objects, and more particularly, to sensing coins.

BACKGROUND

Electromagnetic measurements of coins can be used to determine whether a coin is a genuine coin and belonging to a certain class or denomination. Typically, an inductance is mounted in proximity to a coin path so that the field generated by applying a drive signal to the inductance is influenced by the coin as it passes.

The coil can be driven using a drive signal that contains a broad spectrum of frequencies, e.g. by applying a square wave drive signal containing multiple harmonics. The influence of the coin on the field can then be sampled at successive time instants relative to the transitions in the drive signal. The samples taken at different times are predominantly influenced by material at different depths within the coin. This time-domain measuring technique can have advantages as compared to frequency-domain measurements using analog filters.

Parameters of the measurement samples can be compared against parameters of the reference measurements in different ways in order to determine whether a coin is a genuine coin and belonging to a certain class or denomination. For example, reference waveforms can be obtained by taking measurements of actual samples of a coin, and can be subsequently stored on the coin tester. These reference waveforms can be compared against the waveforms obtained by the coin tester when a coin under test is brought into proximity with the coin sensor to determine whether a coin falls within a classification of any particular denomination.

Employing such an approach bears several disadvantages. First, such an approach is predicated upon having access to a physical sample of the coin when it is being characterized in the lab. However, having access to a physical sample of the coin during characterization may not be possible if the coin has not yet been fabricated.

Second, even if a physical sample of the coin is available for characterization, such an approach involves an iterative process of trial and error, which is time-consuming and expensive. For example, the results of a fabricated physical coin sample that has been characterized using a particular coil construction may reveal that the underlying design of the coil, coin, or any combination thereof does not provide an acceptable degree of discrimination. Therefore, employing such an approach may result in having to carry out multiple iterations of design, fabrication, and characterization of coils and coins until it is determined that the combination of the coil and the coin provide an acceptable degree of discrimination.

Also, since the reference waveforms captured in the lab can be dependent on the driving signal, such an approach requires that the same driving be used on the coin tester. Such a constraint can be disadvantageous in an application where it is desirable to drive the coin sensor using a random signal. This approach can also be disadvantageous in instances where the coin tester is simply not capable of replicating the precise waveform that was used to stimulate the coin sensor in the lab, or to the extent that the replication accuracy drifts over time.

In cases where the conductor radius is infinite with respect to the coil radius, it is possible to use a TREE algorithm to derive an analytical solution to the impedance change of a coil that is driven by a random input. However, the TREE algorithm proposed by Theodoulidis et al., is predicated on an assumption that the size of the conductor is infinitely large relative to the size of the sensor, such that edge effects of the conductor material can be neglected. In other words, the approach proposed by Theodoulidis et al., requires the size of the sensor to be sufficiently small with respect to the size of the conductor, and is unsuitable for applications in which the edge-effects of the conductor are more significant. See, for example, T. P. Theodoulidis, J. R. Bowler *The Truncated Region Eigenfunction Expansion method for the solution of boundary value problems in eddy current nondestructive evaluation*. Review of Quantitative Nondestructive Evaluation Vo. 24, 2005; T. P. Theodoulidis.

Therefore, there exists a need for more efficient, high performance, cheaper, low complexity coin sensor that is capable of classifying multi-layer coins without using priori knowledge of the input signal. There also exists a need for an efficient solution for designing a coin tester in the absence of having a physical sample of the coins to be accepted. Applicant believes that the present disclosure addresses some of the concerns discussed above and/or other concerns.

SUMMARY OF THE INVENTION

In an implementation, a coin tester apparatus comprises a broadband signal generator configured to output a driving signal; a coin sensor coupled to said driving signal, said coin sensor configured to output a measurement signal in response to said driving signal, wherein said measurement signal is configured to be influenced by the presence of a coin; a computer-readable storage medium configured to store an impedance model of said coin sensor, said impedance model representing an expected influence of at least one coin configuration parameter on said measurement signal; and a processor configured to compute a coefficient of said model in the presence of said coin and apply acceptance criteria to said coefficient to determine whether said coin falls within a predetermined coin classification.

In another implementation, a driving signal comprises a pseudorandom sequence.

In another implementation, the driving signal comprises a pseudorandom pulse train.

In another implementation, the measurement signals represent an effect of inducing eddy currents in said coin.

In another implementation, the measurement signal comprises a digital signal.

In another implementation, the coin sensor comprises a coil.

In another implementation, the coin configuration radius is less than said coil radius.

In another implementation, the impedance model accounts for edge effects of said coin configuration on said influence to said measurement signals.

In another implementation, the coin sensor comprises a driver coil and a pickup coil.

In another implementation, the storage media comprises a non-volatile memory device coupled to said processor.

In another implementation, the impedance model is initially computed in the absence of having a physical coin sample.

In another implementation, a temperature sensor is configured to sense an ambient temperature, and the processor is further configured to compute the effect of said ambient temperature on said coefficient.

In another implementation, the coin configuration comprises a total number of layers.

In another implementation, the at least one coin configuration parameter comprises permeability of a layer.

In another implementation, the at least one coin configuration parameter comprises conductivity of a layer.

In another implementation, the at least one coin configuration parameter comprises homogeneity of a layer.

In another implementation, the predetermined coin classification comprises a non-genuine coin classification.

In another implementation, the at least one coin configuration parameter comprises layer material properties.

In another implementation, the at least one coin configuration parameter comprises a lift-off dimension between said coil and said coin.

In another implementation, a method for testing a coin using a coin tester comprises driving a coin sensor using a broadband signal; obtaining measurement samples from said coin sensor in the presence of a coin, wherein said measurement samples represent an influence of said coin on a field generated by said coin sensor in response to said driving signal; solving for, via a processor, coefficients of an impedance model of said coin sensor, said impedance model representing an expected influence of at least one coin configuration parameter on said measurement signal; and applying acceptance criteria to said coefficients to determine whether said coin falls within a predetermined classification of coins.

In another implementation, the broadband signal comprises a pseudorandom sequence.

In another implementation, the broadband signal comprises a pseudorandom pulse train.

In another implementation, the measurement samples represent an effect of inducing eddy currents in said coin.

In another implementation, the measurement samples comprise a digital signal.

In another implementation, the coin sensor comprises a coil.

In another implementation, the coin configuration radius is less than said coil radius.

In another implementation, the impedance model accounts for edge effects of said coin on said coin sensor.

In another implementation, the coin sensor comprises a driver coil and a pickup coil.

In another implementation, the storage media comprises a non-volatile memory device coupled to said processor.

In another implementation, the impedance model is initially computed in the absence of having a physical coin sample.

In another implementation, the ambient temperature is measured using a temperature sensor and computing the effect of the ambient temperature on said coefficients.

In another implementation, the at least one coin configuration parameter comprises a total number of layers.

In another implementation, the at least one coin configuration parameter comprises permeability of a layer.

In another implementation, the at least one coin configuration parameter comprises conductivity of a layer.

In another implementation, the at least one coin configuration parameter comprises homogeneity of a layer.

In another implementation, the predetermined coin classification comprises a non-genuine coin classification.

In another implementation, the at least one coin configuration parameter comprises layer material properties.

In another implementation, the at least one coin configuration parameter comprises a lift-off dimension between said coil and said coin.

In another implementation, a computer-system implemented method of simulating an influence of a coin on a field generated by a coil comprises: receiving, via a processor, at least one coil parameter; receiving, via said processor, at least one coin configuration parameter; computing, via said processor, the influence of said at least one coin configuration parameter on said field based upon at least said coil parameters and said coin configuration parameters.

In another implementation, said computation accounts for edge effects of said coin configuration on said influence.

In another implementation, said at least one coil parameter comprises a number of coils.

In another implementation, said at least one coil parameter comprises a height.

In another implementation, said at least one coil parameter comprises an outer radius.

In another implementation, said at least one coil parameter comprises an inner radius.

In another implementation, said at least one coil parameter comprises a number of turns.

In another implementation, said at least one coin configuration parameter comprises a plurality of layers of a multilayer coin, each layer having a plurality of layer parameters.

In another implementation, said at least one coin configuration parameter comprises a plurality of layer parameters.

In another implementation, said plurality of layer parameters comprises a radius dimension.

In another implementation, said plurality of layer parameters comprises a height dimension.

In another implementation, said plurality of layer parameters comprises a relative permeability of said layer material.

In another implementation, said plurality of layer parameters comprises a conductivity of said layer material.

In another implementation, said plurality of layer parameters comprises a layer material specification.

In another implementation, said at least one coil parameter comprises a lift-off dimension between said coin and said coil.

In another implementation, said at least one coil parameter comprises a drive frequency of said coil.

In another implementation, said processor is further configured to express said influence as a change in said coil impedance over frequency.

In another implementation, said processor is further configured to express said influence as a change in said coil relative impedance over frequency.

In another implementation, said processor is further configured to express said influence as said coil impedance over frequency.

In another implementation, said processor is further configured to express said influence as a change in said coil impedance over frequency.

In another implementation, said at least one coil parameter comprises a number of coils, said processor further configured to express said influence a mutual impedance of said number of coils over frequency.

In another implementation, said processor is further configured to express said influence as a change a normalized impedance plane diagram.

In another implementation, said at least one coil parameter comprises a coil current.

In another implementation, said at least one coil parameter comprises a dimensional tolerance.

In another implementation, said at least one coin configuration parameter comprises a dimensional tolerance.

In another implementation, said at least one coin configuration parameter comprises a material homogeneity.

In another implementation, said at least one coin configuration parameter comprises a lift-off tolerance.

In another implementation, said at least one coin configuration parameter comprises a material tolerance.

In another implementation, said processor is further configured to express said influence as a representation of eddy currents induced in said coin.

In another implementation, said coin comprises a plurality of layers, said processor configured to express said influence as a representation of eddy currents induced in each layer.

In another implementation, said processor is further configured to compute a discrimination between said coin and a reference dataset.

In another implementation, said reference dataset comprises a second coin configuration.

In another implementation, a computer-readable medium having computer-executable instructions for performing a method comprising: receiving, via a processor, at least one coil parameter; receiving, via said processor, at least one coin configuration parameter; computing, via said processor, said influence of said coin configuration based upon at least said coil parameters and said coin parameters.

In another implementation, an item of currency tester apparatus comprises: a broadband signal generator configured to output a driving signal; a sensor coupled to said driving signal, said sensor configured to output a measurement signal in response to said driving signal, wherein said measurement signal is configured to be influenced by the presence of an item of currency having a metallic structure or security feature; a computer-readable storage medium is configured to store an impedance model of said sensor, said impedance model representing an expected influence of at least one item of currency configuration parameter on said measurement signal; and a processor is configured to compute a coefficient of said model in the presence of said item of currency and apply acceptance criteria to said coefficient to determine whether said item of currency falls within a predetermined coin classification.

In another implementation, said item of currency comprises a banknote.

In another implementation, said metallic structure comprises at least one foil.

In another implementation, said reference dataset comprises at least one film.

In another implementation, a method of testing an item of currency using an item of currency tester, comprises driving a sensor using a broadband signal; obtaining measurement samples from said sensor in the presence of an item of currency having a metallic structure or security feature, wherein said measurement samples represent an influence of said item of currency on a field generated by said sensor in response to said driving signal; solving for, via a processor, coefficients of an impedance model of said sensor, said impedance model representing an expected influence of at least one item of currency configuration parameter on said measurement signal; and applying acceptance criteria to said coefficients to determine whether said item of currency falls within a predetermined classification of items of currency.

In another implementation, said item of currency comprises a banknote.

In another implementation, a computer-system implemented method of simulating an influence of an item of currency on a field generated by a coil, comprises receiving, via a processor, at least one coil parameter; receiving, via said processor, at least one item of currency configuration parameter; computing, via said processor, said influence of said at least one item of currency configuration parameter based upon at least said coil parameters and said item of currency configuration parameters.

In another implementation, said item of currency comprises a banknote.

In another implementation, a computer-readable medium having computer-executable instructions for performing a method comprises receiving, via a processor, at least one coil parameter; receiving, via said processor, at least one item of currency configuration parameter; computing, via said processor, said influence of said item of currency configuration based upon at least said coil parameters and said item of currency parameters.

In another implementation, the computer readable medium of said item of currency comprises a banknote.

These and other features of the invention are described in detail below.

DETAILED DESCRIPTION

A coin tester and methods are disclosed herein. In one aspect, the coin tester comprises a stored impedance model of the coin sensor, wherein the stored impedance model represents an expected influence of a coin configuration on the coin sensor measurement signal. The coefficients of the stored impedance model can be computed on the coin tester. Acceptance criteria can be applied to the coefficients to determine whether the coin falls within a predetermined classification of coins. In another aspect, an analytical solution can be used to express the influence of a coil in the presence of a coin configuration, and can be computed in the absence of having a physical coin sample. In a further aspect, a computerized method of designing coin configurations, designing coils, and optimizing discrimination is disclosed herein.

As used in this disclosure the term "coin" is employed to mean any coin (whether valid or counterfeit), token, slug, washer, or other metallic object or item, and especially any metallic object or item which could be utilized by an individual in an attempt to operate a coin-operated device or system. A "valid coin" is considered to be an authentic coin, token, or the like, and especially an authentic coin of a monetary system or systems in which or with which a coin-operated device or system is intended to operate and of a denomination which such coin-operated device or system is intended selectively to receive and to treat as an item of value.

Figure 1:
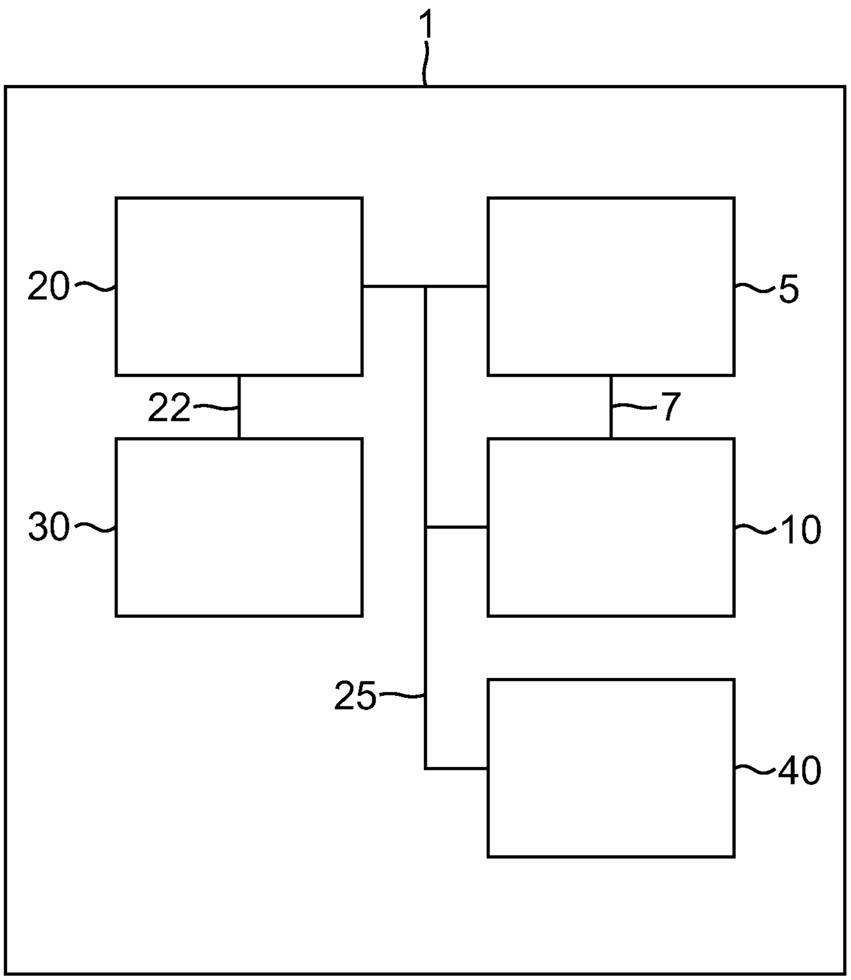
FIG. 1 is a schematic view of a coin tester according to an embodiment.

In some implementations, as shown in FIG. 1, a coin tester 1 can include a broadband signal generator 5, a coin sensor 10, a processor, 20, a computer-readable storage medium 30, and a temperature sensor 40. The processor 20 can be coupled to the storage medium 30 via an address and data bus 22. The processor 20 can also be coupled to broadband signal generator 5, coin sensor 10, and temperature sensor 40 through communication bus 25. The broadband signal generator 5 driving signal is also coupled to the coin sensor 10 through link 7.

The processor 20 is configured to control the broadband signal generator 5, coin sensor 10, and temperature sensor 40. The broadband signal generator 5 is configured to output a driving signal over link 7 to coin sensor 10. The coin sensor 10 is configured to output a measurement signal (not shown) in response to receiving the driving signal from the broadband signal generator 5. The measurement signal that is output from the coin sensor 10 is configured to be influenced by the presence of a coin (not shown).

In one aspect, the storage medium 30 is configured to store an impedance model of the coin sensor 10. This impedance model can represent an expected influence of one or more coin configuration parameters on the measurement signal produced by the coin sensor 10. The coin configuration parameters can be, but are not limited to, a total number of layers, layer conductivity, layer permeability, layer homogeneity, layer material, lift-off, or any combination thereof. As will be discussed in later sections of the present disclosure, such an impedance model can be derived in the lab, and in absence of having a physical coin sample. In this manner, the apparatus and method can be used with existing coins and also as a predictive tool in helping design future coins. After the impedance model is derived, it can then be stored on the storage medium 30.

In another aspect, the processor 20 is configured to compute a coefficient of the impedance model during or after the time when a coin is brought into proximity with the coin sensor 10. The processor is also configured to apply acceptance criteria to the computed coefficient to determine whether the received coin falls within a predetermined coin classification. In some implementations, the acceptance criteria can comprise a determination as to whether the coin under test is consistent with a non-genuine coin classification.

In some implementations, the driving signal can comprise a pseudo-random sequence, pulse-train, sinusoidal wave, sawtooth, or any combination thereof. However, it should be understood that the driving signal can also comprise any signal without departing from the spirit and scope of the present disclosure. As used in this disclosure, the term "random" is intended herein to include, without limitation, not only purely random, non-deterministically generated signals, but also pseudo-random and/or deterministic signals such as the output of a shift register arrangement provided with a feedback circuit to generate pseudo-random binary signals, and chaotic signals.

As discussed in the preceding sections, the processor 20 is configured to control the broadband signal generator 5 over the communication bus 25. In one aspect, the processor can be configured to control various characteristics of the broadband signal generator 5 output driving signal, such as but not limited to signal type, signal shape, frequency, rise time, fall time, dead time, voltage, current, or any combination thereof. In some implementations, the broadband signal generator 5 can contain an internal analog-to-digital converter, which samples and digitizes and broadband signal generator 5 output driving signal. In some designs, the processor 25 can command the broadband signal generator 5 to transmit the digitized signal over the communication bus 25.

Figure 2:
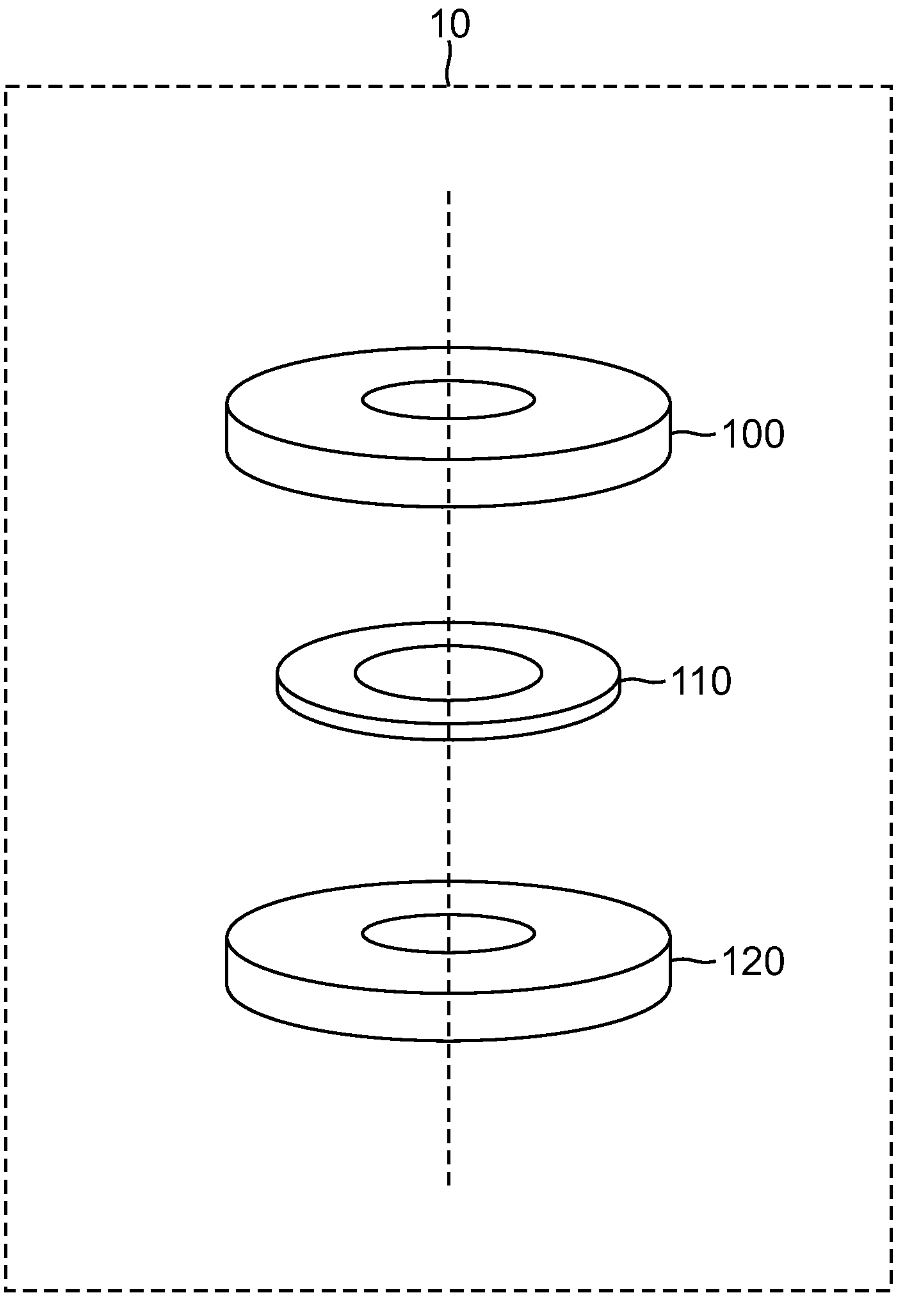
FIG. 2 is a three-dimensional view of a coin sensor according to an embodiment.

In some embodiments, the coin sensor 10 comprises a coil. In some aspects, the coil can comprise a wire, which itself is wound N turns around a toroidal core. For example, referring to FIG. 2, the coin sensor 10 can comprise a coil 100, itself comprising a wire (not shown), which is wound N times around toroid core. In some implementations, the toroid can comprise a ferromagnetic core, laminated core, ferrite core, ceramic core, plastic core, composite core, or any combination thereof. However, it should be noted that the wire can also be wound N times around an "air core" without departing from the spirit and scope of the present disclosure. It is also to be understood that the coil can comprise different geometries. For example, while the coil 100 geometry shown in FIG. 2 is toroidal, it should be noted that other coil geometries, such as but not limited to planar, cylindrical, spiral, flat, hourglass, etc. can be used without departing from the spirit and scope of the present disclosure.

In some implementations, the coin sensor 10 can comprise a plurality of coils. For example, in the embodiment shown in FIG. 2, the coin sensor 10 comprises a driver coil 100 and a pickup coil 120. Such a dual-coil configuration can be advantageous insofar as it is desensitized to the lift-off dimension between the coin under test and the coil. Coin under test 110 can be disposed in between driver coil 100 and pickup coil 120. Driver coil 100 can be configured to receive a driving signal from the broadband signal generator 5 and to generate a field in response to the driving signal. Pickup coil 120 can be configured to receive the generated field and to output measurement signals which are influenced by the presence of the coin under test 110.

Figure 3:
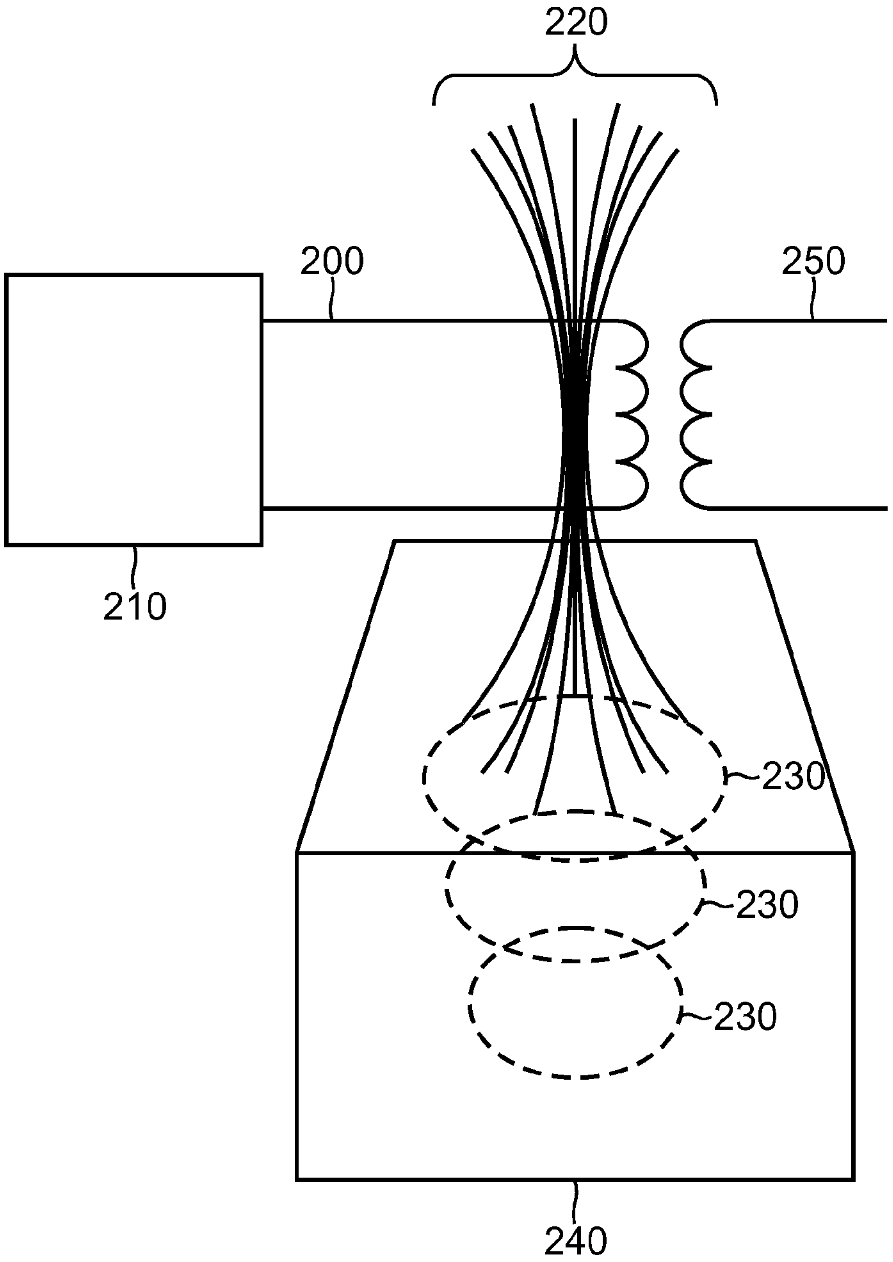
FIG. 3 is a three-dimensional view of a coin sensor according to an embodiment.

In some embodiments, the measurement signals output by the pickup coil 120 can represent an effect of inducing eddy currents in the coin 110. For example, referring to FIG. 3, driver coil 200 driven by source 210 generates a magnetic field 220, which induces eddy currents 230 in the conductor 240. Pickup coil 250 can be placed in proximity to the driver coil 200, and can thereby output measurement signals representing an effect of inducing eddy currents in the coin 110.

Referring back to FIG. 2, the driver and pickup coils 100 and 120 respectively can be part of a bridge circuit, standalone, couple to additional circuitry, or any combination thereof. For example, the pickup coil 120 measurement signals can be coupled to an analog-to-digital converter circuit, which outputs a digital measurement signal. Referring to FIG. 1, such digital measurement signals can be output through the communication bus 25 to the processor 20 for subsequent processing. Referring back to FIG. 2, the coin sensor 10 can also include signal-processing circuitry, wherein the signal processing circuitry preprocesses the driving signal before it is applied to the driving coil 100.

As shown in the figure, driver and pickup coils 100 and 120 each have an outer radius that is greater than the outer radius of the coin under test 110. In such a configuration, edge effects of the coin under test can have a significant influence on the impedance change of the coil in the presence of the coin under test because the net change in coil reactance in the presence of a coin decreases in proportion to the ratio of coil to coin radius. Therefore, solutions which neglect such edge effects, such as the one proposed by Theodoulidis et al., may not provide an acceptable degree of accuracy for some coil/coin configuration combinations.

Figure 18:
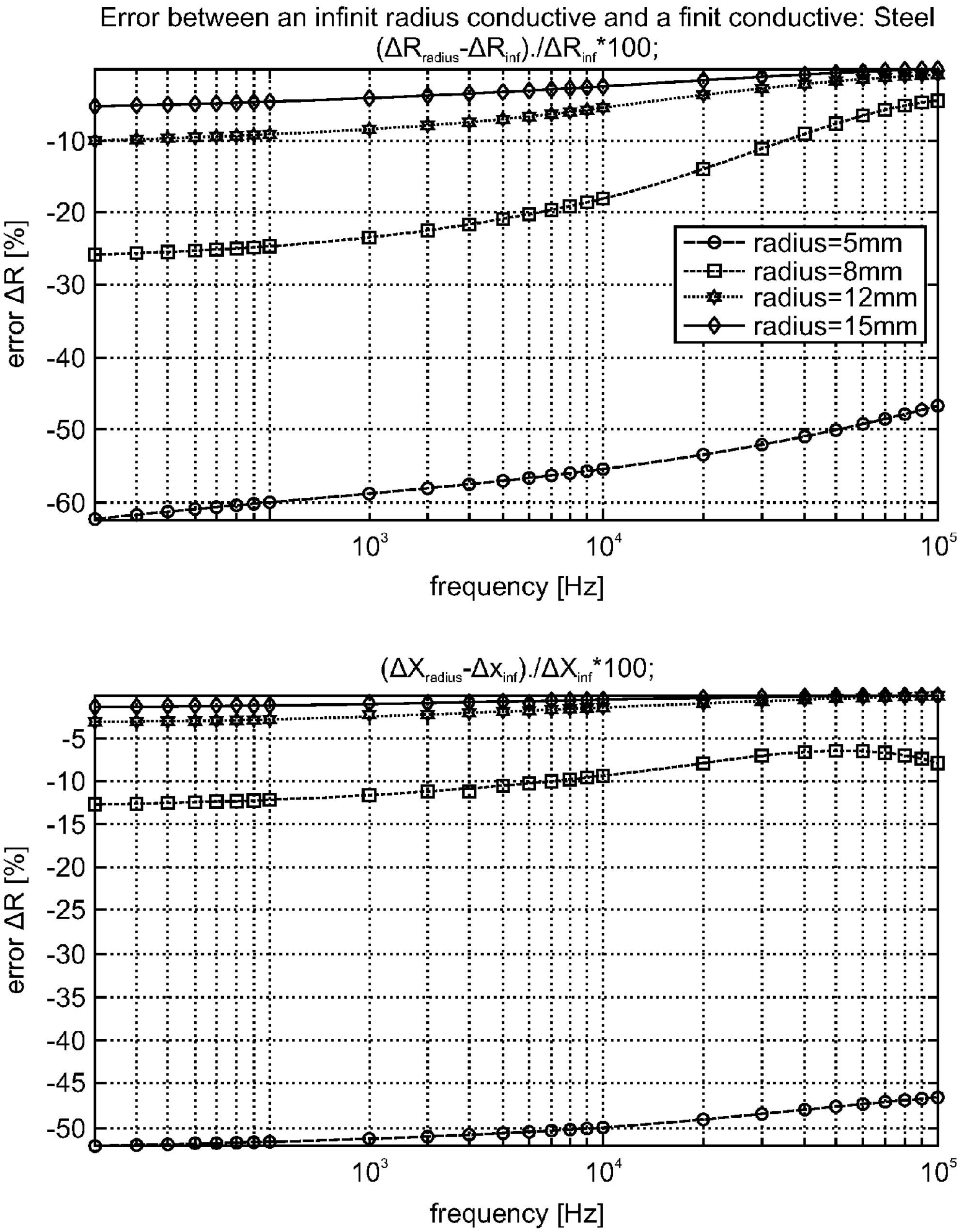
FIG. 18 is a plot illustrating the error associated with neglecting edge effects of a conductor.
Figure 19:
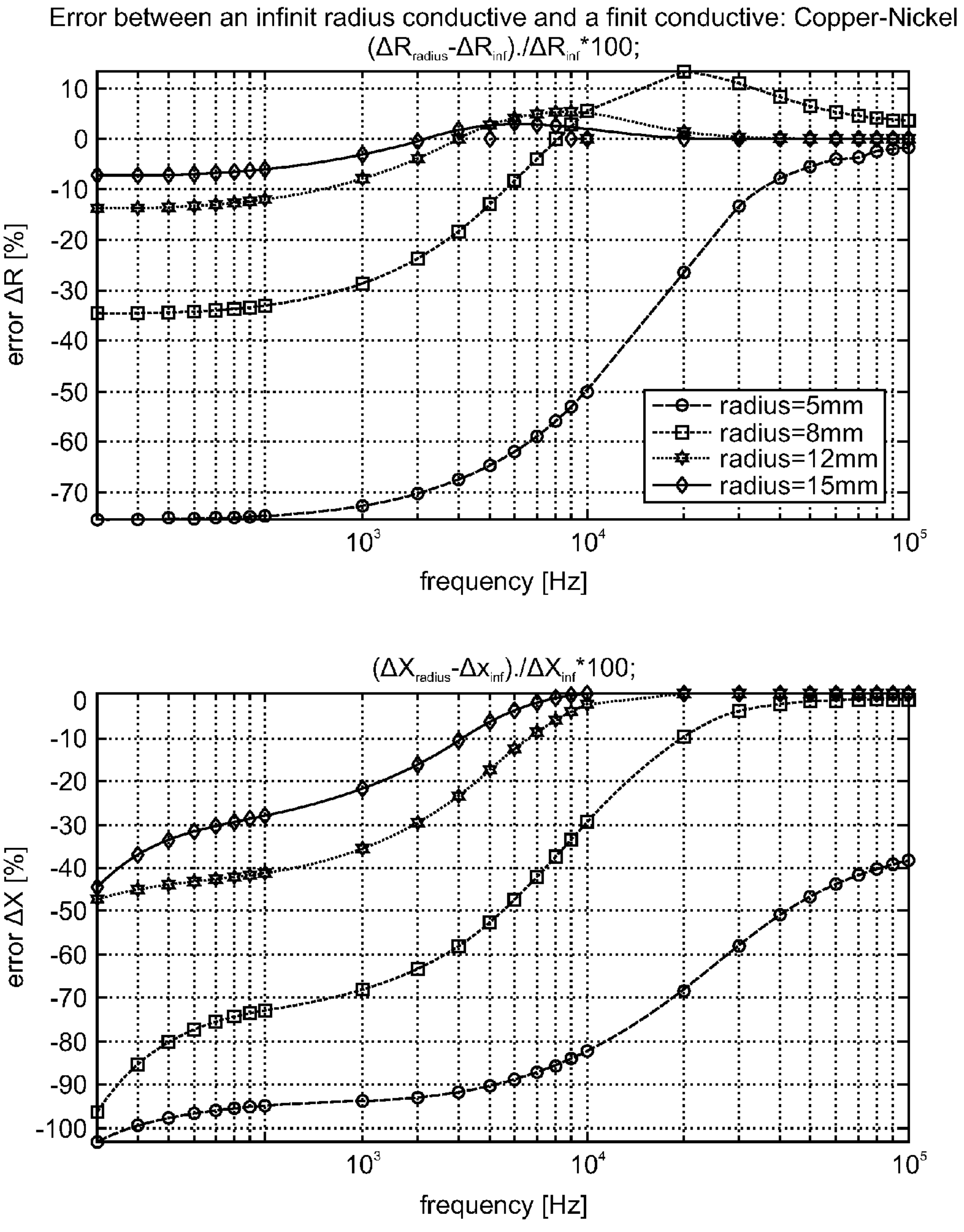
FIG. 19 is a plot illustrating the error associated with neglecting edge effects of a conductor.

For example, FIG. 18 illustrates the error which arises from applying the solution proposed by Theodoulidis et al., which is predicated on an assumption that the conductor radius is infinitely large relative to the sensor radius, such that edge effects of the conductor can be neglected, to a coil/coin configuration combination according to the coil/coin 1 parameters of Table 1, wherein $r_1$ is the coil inner radius, $r_2$ is the coil outer radius, $z_2$-$z_1$ is the coil thickness, $z_1$ is the lift-off dimension between the coil and the coin configuration, and N is the number of turns. FIG. 19 illustrates the error which arises by applying the solution proposed by Theodoulidis et al., to a coil/coin configuration combination according to the coil/coin 2 parameters of Table 1.

TABLE 1

| Coil Parameters | | Coin Parameters | | | | |
|---|---|---|---|---|---|---|
| | | Coin | Material | σ (MS/m) | $\mu_r$ | Thickness (mm) |
| $r_1$ | 4 mm | 1 | Steel | 6.206 | 200 | 3 |
| $r_2$ | 6 mm | 2 | Copper-Nickel | 2.6 | 1 | 3 |
| $z_2$-$z_1$ | 4 mm | 3 | — | — | — | — |
| $z_1$ | 0.5 mm | 4 | — | — | — | — |
| N | 200 | 5 | — | — | — | — |

As shown in the figures, the percentage error in the computed change of reactance and resistance of a coil is inversely proportional to the ratio between the coil and coin configuration radius. Therefore, as will be discussed in forthcoming sections of the present disclosure, in some embodiments, an impedance model which accounts for such edge effects can be derived in the lab and stored on the coin tester based upon a closed-form analytical solution disclosed herein.

The apparatus and methods disclosed herein are applicable to accounting for the edge-effects of a coin configuration to the measurement signals produced by a coin sensor over a broad range of ratios between the coin sensor/coil radius to the coin configuration radius, such as but not limited to the following ratios: 0.000001, 0.000002, 0.000005, 0.000010, 0.000020, 0.000050, 0.000100, 0.000200, 0.000500, 0.001000, 0.002000, 0.005000, 0.010000, 0.020000, 0.050000, 0.100000, 0.200000, 0.500000, 1.00, 2.00, 5.00, 10.00, 20.00, 50.00, 100.00, 200.00, 500.00, 1000.00, 2000.00, 5000.00, 10,000.00, 20,000.00, 50,000.00, 100,000.0, 200,000.0, 500,000.0, 1,000,000.0, 10,000,000.0, and ranges between any two of these.

As noted earlier, referring back to FIG. 1, the computer readable storage medium 30 can be coupled to the processor via an address and data bus 22. In some implementations, the computer readable storage medium can comprise a non-volatile memory. However, it should be noted that the computer readable storage medium can comprise other devices, and need not necessarily be coupled to the processor 20 via an address and data bus 22. For example, the computer readable storage medium can comprise ROM, RAM, flash memory, EEPROM, hard disk, CD, DVD, solid state memory, floppy disk, tape, blu-ray, or any combination thereof without departing from the spirit and scope of the present disclosure. By way of further example, the computer readable storage medium can be coupled to processor via $i^2c$, SPI, ethernet, wirelessly, fiber optics, or any combination thereof.

In a further embodiment, the temperature sensor 40 is configured to sense an ambient temperature of the coin tester 1. In one aspect, the processor 20 can be configured to compute the expected effect of the ambient temperature on the model coefficient.

Figure 7:
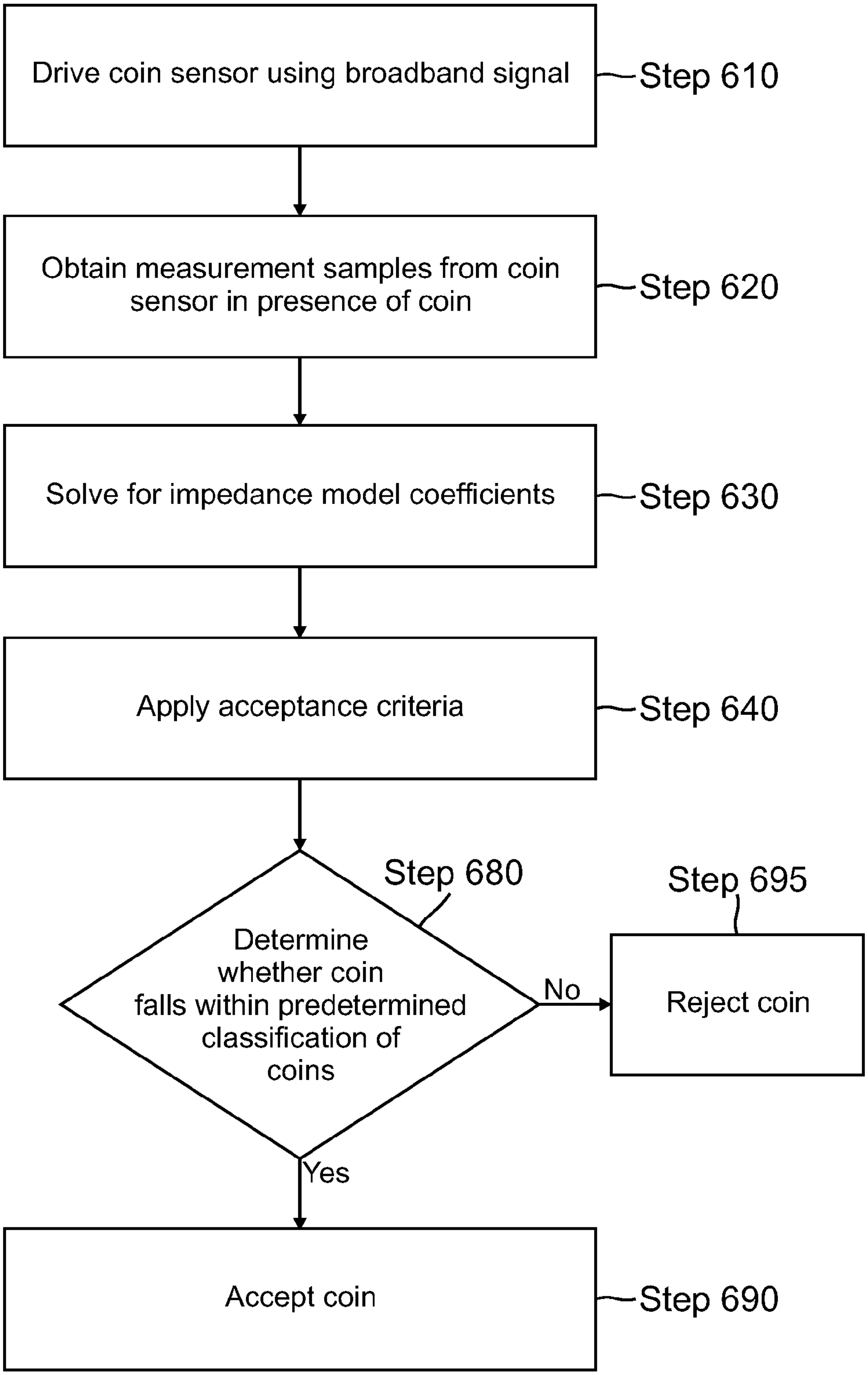
FIG. 7 is a flowchart illustrating the testing of a coin according to an embodiment.

In another aspect, methods of testing a coin using a coin tester are disclosed herein. In some implementations, as generally shown in steps 610-695 of FIG. 7, a method of testing a coin can comprise the steps of driving the coin sensor, obtaining measurement samples in the presence of a coin, solving for impedance model coefficients, applying acceptance criteria, and determining whether the coin falls within a predetermined classification of coins. In some embodiments, the method can also comprise the steps of accepting the coin, step 690, or rejecting the coin, step 695.

As discussed in the preceding sections, an analytical solution that provides an impedance model that represents the expected influence of a coin configuration on a measurement signal output by a coin sensor is herein disclosed. This impedance model can be used to determine the expected influence of a coin configuration on a coin sensor measurement signal in the absence of having a physical sample of the coin. In some embodiments, the derived model accounts for an edge effect of the coin configuration on the influence to the expected coin sensor measurement signal. The derived model can be subsequently stored on a computer readable storage medium of a coin tester, and can be used to aid in determining whether a coin under test falls within a predetermined coin classification.

Figure 4:
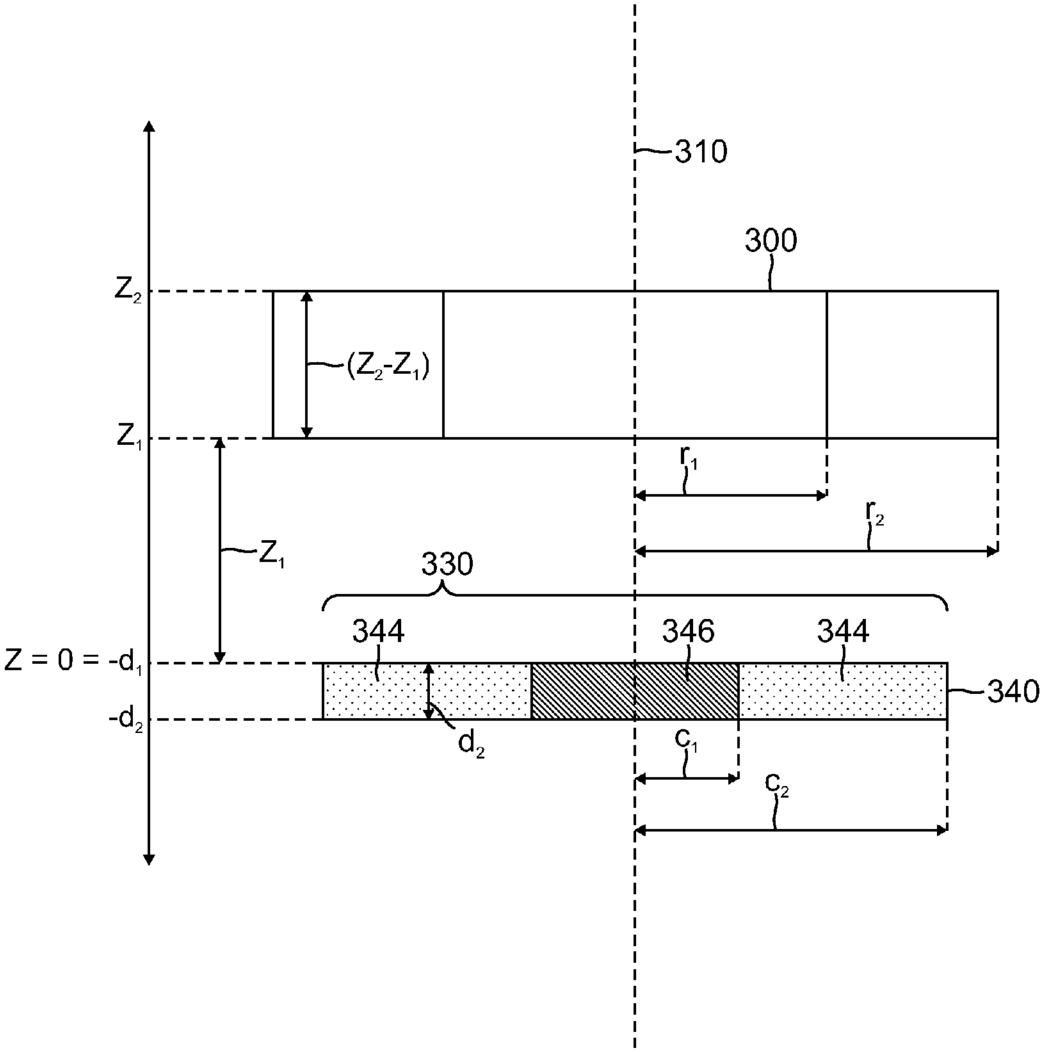
FIG. 4 is a cross-sectional view of a coil brought into proximity to a non-homogeneous single-layer coin configuration according to an embodiment.
Figure 5:
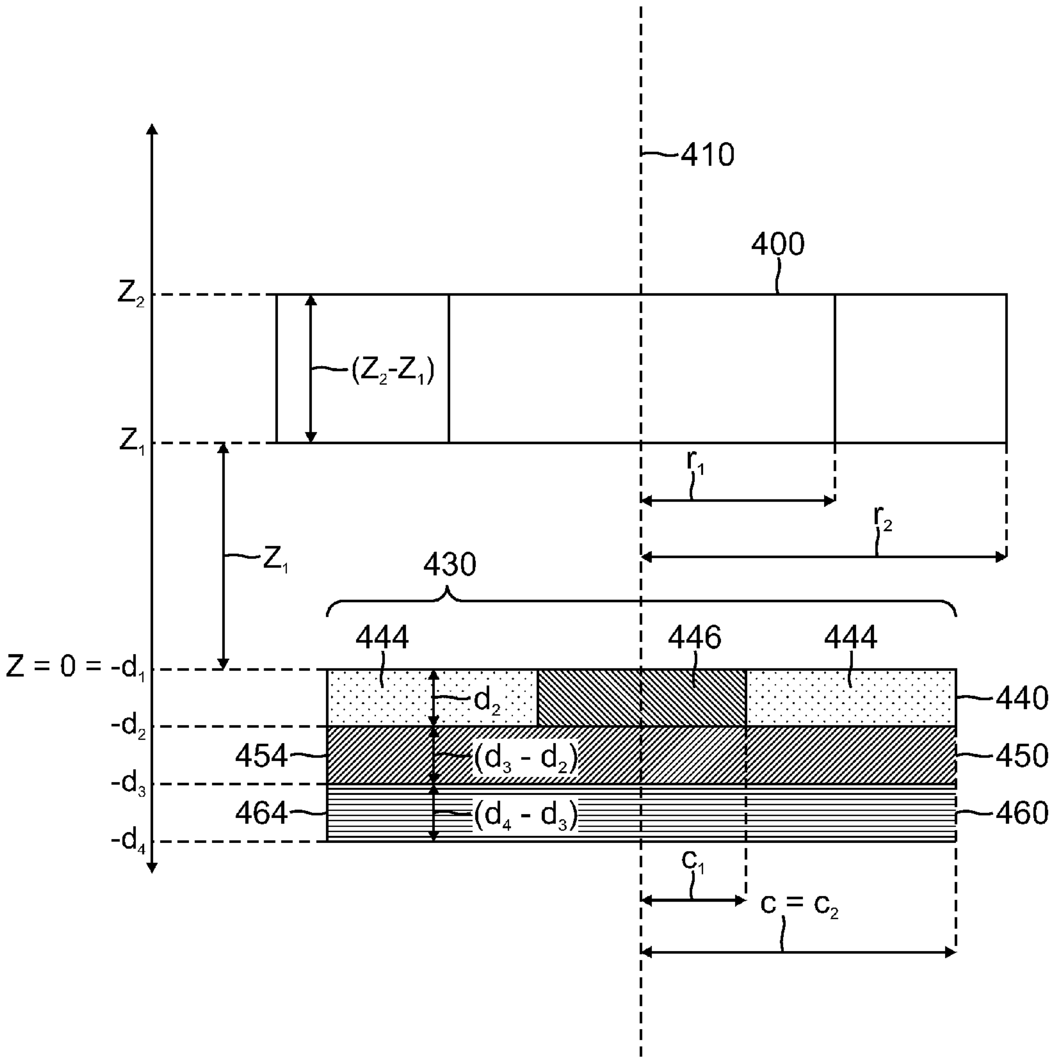
FIG. 5 is a cross-sectional view of a coil brought into proximity to a multi-layer coin configuration according to an embodiment.
Figure 6:
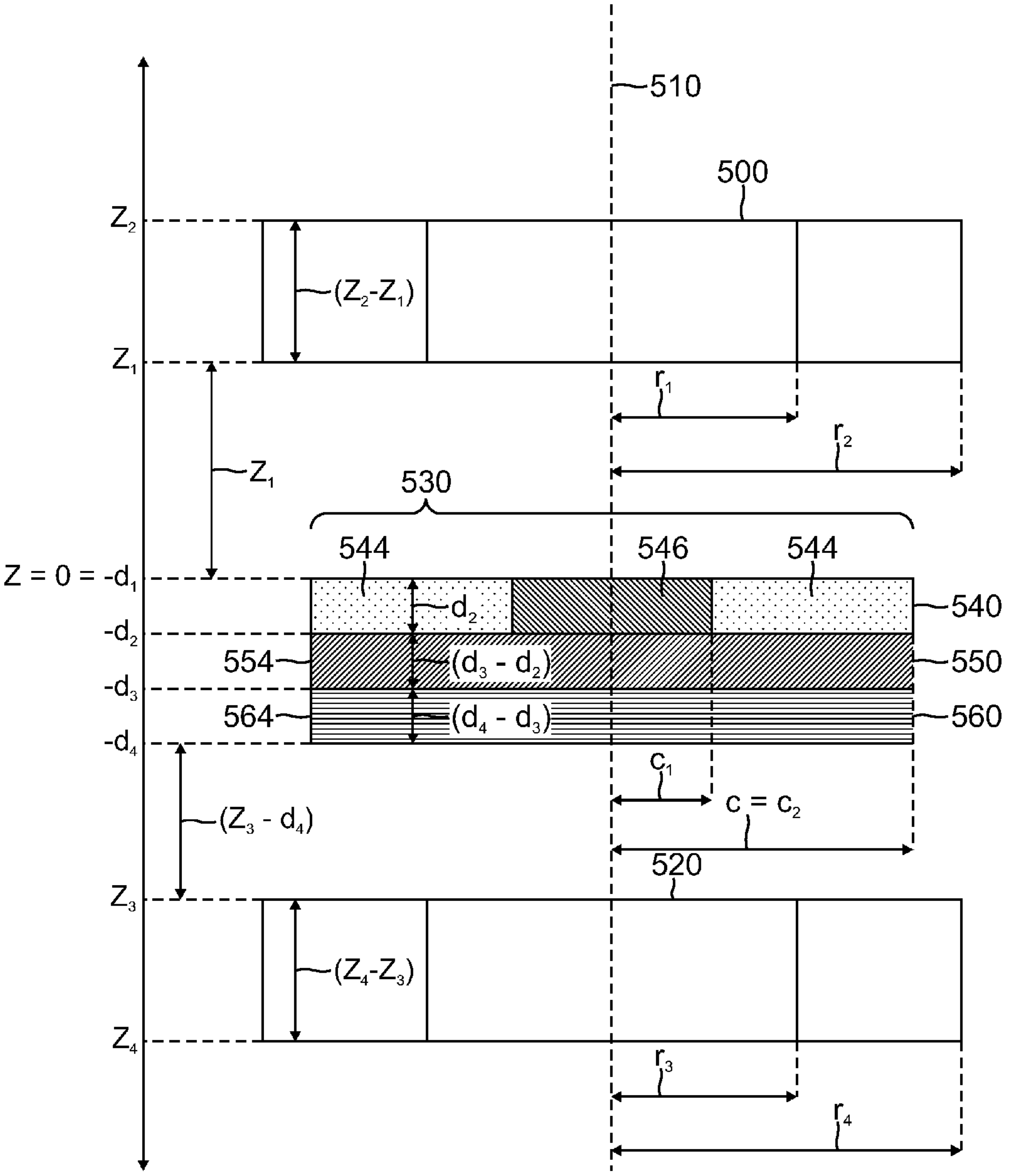
FIG. 6 is a cross-sectional view of a dual-coil brought into proximity to a multi-layer coin configuration according to an embodiment.

Throughout FIGS. 4-6, coils 300, 400, and 500 are shown schematically for clarity. It should be noted that while the turns are not depicted, one skilled in the art will appreciate that the coil will have one or more turns. As shown in FIG. 4, a coil 300 has a center axis 310, height ($z_2$-$z_1$), inner radius $r_1$, outer radius $r_2$, wherein the outer radius $r_2$ is greater than the outer radius $c_2$ of a coin configuration 330. In some aspects, the coil 300 outer radius $r_2$ to coin configuration 330 outer radius $c_2$ ratio can give rise to substantial edge effects of the coin configuration 330. The top surface of the coin configuration 330 and the bottom surface of the coil 300 are separated by a lift-off dimension $z_1$. The coin configuration 330 itself can comprise a single non-homogeneous first layer 340 of concentric first and second materials 344 and 346, having a height $d_2$, and an inner radius $c_1$. Each of the first and second materials 344 and 346 second materials 344 and 346 also have inherent properties of conductivity $\sigma_{1e}$ and $\sigma_{1c}$ respectively. In one aspect, each of the first and second materials can be made from different materials, elements, compounds, or alloys. It should be noted that it is possible to use non-conductors in the coin design. For example, it is possible for the second material 346 to be a plastic, ceramic, composite, air, or any combination thereof.

In some embodiments, as shown in FIG. 5, a coil 400 has a center axis 410, height ($z_2$-$z_1$), inner radius $r_1$, outer radius $r_2$, wherein the coil 400 outer radius $r_2$ to coin configuration 430 outer radius c ratio gives rise to substantial edge effects of coin configuration 430. The top surface of the coin configuration 430 and the bottom surface of the coil 400 are separated by a lift-off dimension $z_1$.

The coin configuration 430 itself can comprise a non-homogeneous first layer 440, a homogeneous second layer 450, and a homogeneous third layer 460. First layer 440 is itself comprised of concentric first and second materials 444 and 446 having a height of $d_2$, and an inner radius $c_1$. Each of the first and second materials 444 and 446 can have inherent properties of relative permeability $\mu_{r1e}$ and $\mu_{r1c}$ respectively. Each of the first and second materials 444 and 446 also have inherent properties of conductivity $\sigma_{1e}$ and $\sigma_{1c}$ respectively. Second layer 450 is itself comprised of a homogeneous material 454 having a height of ($d_3$-$d_2$), and has an inherent property of relative permeability $\mu_{r2}$ and conductivity $\sigma_2$. Similarly, third layer 460 is itself comprised of a homogeneous material 464 having a height of ($d_3$-$d_4$), and has an inherent property of relative permeability $\mu_{r3}$ and conductivity $\sigma_3$.

An impedance model, which takes into account the coin configuration edge effects of the aforementioned coil/coin configurations can be expressed in terms of the angular frequency w, free space permeability constant $\mu_0$, number of coil turns N, a source wave vector C, a diagonal matrix K of eigenvalues $k_i$ a diagonal matrix E of the dot product of two Bessel functions, and a full matrix $R_{0/1s}$ representing the reflection coefficient between the conductor layer 0 and layer 1, according to the following set of equations:

$$Z_0 = \frac{j\omega 4\pi\mu_0 N^2}{(r_2-r_1)^2(z_2-z_1)^2}\sum_{i=1}^{\infty}\frac{\chi^2(k_ir_1,k_ir_2)}{[hJ_0(k_ih)]^2k_i^7}\left[k_i(z_2-z_1)+e^{-k_i(z_2-z_1)}-1\right] \quad \text{(Equation 1)}$$

$$\Delta Z = \frac{j\omega\pi\mu_0 N^2}{(r_2-r_1)^2(z_2-z_1)^2}C^TKE^{-1}R_{0/1s}C \quad \text{(Equation 2)}$$

$$C = (e^{-kz_1}-e^{-kz_2})K^{-4}\chi(kr_1,kr_2) \quad \text{(Equation 3)}$$

$$K = \begin{bmatrix} k_1 & \cdots & 0 \\ \vdots & \ddots & \vdots \\ 0 & \cdots & k_N \end{bmatrix} \quad \text{(Equation 4)}$$

-continued $$E = \begin{bmatrix} \frac{h^2}{2}J_0^2(k_1h) & \cdots & 0 \\ \vdots & \ddots & \vdots \\ 0 & \cdots & \frac{h^2}{2}J_0^2(k_2h) \end{bmatrix} \quad \text{(Equation 5)}$$

$$R_{0/1s} = 2U_1(I+R_{1/2})\left[U_1(I+R_{1/2})+K^{-1}V_1P_1(I-R_{1/2})\right]^{-1}-I \quad \text{(Equation 6)}$$

The full matrix $R_{j/j+1}$ is reflection coefficient between the conductor layer j and j+1, and can be expressed according to the following equation:

$$R_{j/j+1}=e^{-p_jd_{j+1}}\{2U_j^{-1}U_{j+1}(e^{-p_{j+1}d_{j+1}}+e^{p_{j+1}d_{j+1}}R_{j+1/j+2})\cdot[U_{j+1}(e^{-p_{j+1}d_{j+1}}+e^{p_{j+1}d_{j+1}}R_{j+1/j+2})+U_jP_j^{-1}V_j^{-1}V_{j+1}P_{j+1}(e^{-p_{j+1}d_{j+1}}-e^{p_{j+1}d_{j+1}}R_{j+1/j+2})]^{-1}\cdot U_j-I\}e^{-p_jd_{j+1}} \quad \text{(Equation 7)}$$

The full matrix $T_{j/j+1}$ is the transmission coefficient between the conductor layer j and j+1 and can be expressed according to the following:

$$T_{j-1/j}=2\mu_{r_j}(\mu_{r_j}(e^{-p_jd_j}+e^{p_jd_j}R_{j/j+1})+\mu_{r_j}P_{j-1}^{-1}P_j(e^{-p_jd_j}-e^{p_jd_j}R_{j/j+1}))^{-1}e^{-p_{j-1}d_j}T_{j-2/j-1} \quad \text{(Equation 8)}$$

The term $\chi(k_ir_1,k_ir_2)$ is vector of a finite integral of the Bessel function and can be computed according to the following equation:

$$\chi(k_ir_1,k_ir_2) = \frac{\pi}{2}\left[k_ir_2(J_0(k_ir_2)H_1(k_ir_2)-J_1(k_ir_2)H_0(k_ir_2)) - k_ir_1(J_0(k_ir_1)H_1(k_ir_1)-J_1(k_ir_1)H_0(k_ir_1))\right] \quad \text{(Equation 9)}$$

The term $e^{-kz_1}$ is a diagonal matrix of the attenuation of the wave in the axial direction and can be computed according to the following equation:

$$e^{-kz_1} = \begin{bmatrix} e^{-k_1z_1} & \cdots & 0 \\ \vdots & \ddots & \vdots \\ 0 & \cdots & e^{-k_Nz_1} \end{bmatrix} \quad \text{(Equation 10)}$$

Each of $U_j$ and $V_j$ is a full matrix which represents the mathematical descriptions of each layer of the conductor. For a homogeneous layer, $U_{ij}$ and $V_{ij}$ can be expressed according to the following equations:

$$U_{ij} = \frac{c}{q_j^2-k_i^2}[k_iJ_0(k_ic)J_1(q_jc)-q_jJ_1(k_ic)J_0(q_jc)]R_1(p_jc) - \frac{c}{p_j^2-k_i^2}\left[k_iJ_0(k_ic)J_1(q_jc)-\frac{1}{\mu_r}q_jJ_1(k_ic)J_0(q_jc)\right]R_1(p_jc) \quad \text{(Equation 11)}$$

$$V_{ij} = \frac{1}{\mu_r}\frac{c}{q_j^2-k_i^2}[k_iJ_0(k_ic)J_1(q_jc)-q_jJ_1(k_ic)J_0(q_jc)]R_1(p_jc) - \frac{c}{p_j^2-k_i^2}\left[k_iJ_0(k_ic)J_1(q_jc)-\frac{1}{\mu_r}q_jJ_1(k_ic)J_0(q_jc)\right]R_1(p_jc) \quad \text{(Equation 12)}$$

For a non-homogeneous layer, $U_{ij}$ and $V_{ij}$ can be expressed according to the following equations:

$$U_{ij} = \frac{c_1}{q_j^2 - k_i^2}[k_i J_0(k_i c_1) J_1(q_j c_1) - q_j J_1(k_i c_1) J_0(q_j c_1)] R_1(p_j c_2) + \frac{1}{s_j^2 - k_i^2}[c_2(k_i J_0(k_i c_2) L_1(s_j c_2) - s_j J_1(k_i c_2) L_0(s_j c_2)) - c_1(k_i J_0(k_i c_1) L_1(s_j c_1) - s_j J_1(k_i c_1) L_0(s_j c_1))] R_1(p_j c_2) - \frac{c_2}{p_j^2 - k_i^2} \left\{k_i J_0(k_i c_2) - J_1(k_i c_2)\left[\frac{1}{\mu_e}\left(s L_0(s_i c_2) - \frac{1}{c_2} L_1(s_i c_2)\right) + \frac{1}{c_2} L_1(s_j c_2)\right]\right\} R_1(p_j c_2) \quad \text{(Equation 13)}$$

$$V_{ij} = \frac{1}{\mu_c}\frac{c_1}{q_j^2 - k_i^2}[k_i J_0(k_i c_1) J_1(q_j c_1) - q_j J_1(k_i c_1) J_0(q_j c_1)] R_1(p_j c_2) + \frac{1}{\mu_e}\frac{1}{s_j^2 - k_i^2}[c_2(k_i J_0(k_i c_2) L_1(s_j c_2) - s_j J_1(k_i c_2) L_0(s_j c_2)) - c_1(k_i J_0(k_i c_1) L_1(s_j c_1) - s_j J_1(k_i c_1) L_0(s_j c_1))] R_1(p_j c_2) - \frac{c_2}{p_j^2 - k_i^2} \left\{k_i J_0(k_i c_2) - J_1(k_i c_2)\left[\frac{1}{\mu_e}\left(s L_0(s_i c_2) - \frac{1}{c_2} L_1(s_i c_2)\right) + \frac{1}{c_2} L_1(s_j c_2)\right]\right\} R_1(p_j c_2) \quad \text{(Equation 14)}$$

The term $R_n$(pc) is a diagonal matrix of Bessel function cross products, which can be expressed according to the following:

-continued $$q = \sqrt{p^2 - j\omega\mu_0\mu_{r_j}\sigma_j} \quad \text{(Equation 21)}$$

Eigenvalues, $q_j$, $p_j$, and $s_j$, for a non-homogenous layer j can be computed according to the following set of equations:

$$f(p_i) = \frac{1}{\mu_{r_e}}\left[s L_0(s_i c_2) - \frac{1}{c_2} L_1(s_i c_2)\right] R_1(p_i c_2) - \left[p_i R_0(p_i c_2) - \frac{1}{c_2} R_1(p_i c_2)\right] L_1(s_i c_2) = 0 \quad \text{(Equation 22)}$$

$$f_{approx}(p_i) = \frac{1}{\mu_{r_e}} s L_0(s_i c_2) - \left[\frac{1}{c_2}\left(\frac{1}{\mu_{r_e}} - 1\right) + j \cdot p_i\right] L_1(s_i c_2) = 0; \text{ when } imag(p) > 700 \quad \text{(Equation 23)}$$

$$q = \sqrt{p^2 - j\omega\mu_0\mu_{r_{jc}}\sigma_{jc}} \quad \text{(Equation 23)}$$

$$s = \sqrt{p^2 - j\omega\mu_0\mu_{r_{je}}\sigma_{je}} \quad \text{(Equation 24)}$$

It should be noted that while Equations 1-24 have been discussed in the context of a single-coil configuration, the analytical solution can be extended to other configurations without departing from the spirit and scope of the present disclosure. For example, in one embodiment, as generally shown in FIG. 6, a coin sensor can comprise a driver coil 500 and a pickup coil 520. In this implementation, a driver coil 500 has a center axis 510, height ($z_2$-$z_1$), inner radius, $r_1$, outer $$R_n(pc) = \begin{bmatrix} Y_1(p_1 h) J_n(p_1 c) - J_1(p_1 h) Y_1(p_1 c) & \cdots & 0 \\ \vdots & \ddots & \vdots \\ 0 & \cdots & Y_1(p_N h) J_n(p_N c) - J_1(p_N h) Y_1(p_N c) \end{bmatrix} \quad \text{(Equation 15)}$$

The term $L_n$(sr), a difference vector between Bessel functions with coefficients, can be expressed according to the following set of equations:

$$L_n(s_i r) = [C_{ce} J_n(s_i r) - D_{ce} Y_n(s_i r)] \quad \text{(Equation 16)}$$

$$C_{ce} = \frac{\pi}{2\mu_c}[Y_1(s_i c_1)(J_1(q_i c_1)\mu_e - q_i J_0(q_i c_1)\mu_e c_1 - J_1(q_i c_1)\mu_c) + Y_0(s_i c_1) J_1(q_i c_1)\mu_c c_1 s_i] \quad \text{(Equation 17)}$$

$$D_{ce} = \frac{\pi}{2\mu_c}[J_1(s_i c_1)(J_1(q_i c_1)\mu_e - q_i J_0(q_i c_1)\mu_e c_1 - J_1(q_i c_1)\mu_c) + J_0(s_i c_1) J_1(q_i c_1)\mu_c c_1 s_i] \quad \text{(Equation 18)}$$

Eigenvalues, $q_j$, and $p_j$, for a homogenous layer j can be computed according to the following set of equations:

$$f(p_i) = \frac{1}{\mu_r} R_1(p_i c) J_0(q_i c) q_i - p_i R_0(p_i c) J_1(q_i c) = 0 \quad \text{(Equation 19)}$$

$$f_{approx}(p_i) = \frac{1}{\mu_r} J_0(q_i c) q_i - j \cdot p_i J_1(q_i c) = 0 \text{ when } imag(p) > 700 \quad \text{(Equation 20)}$$

radius, $r_2$, wherein the coil outer radius $r_2$ to coin configuration 530 outer radius c ratio gives rise to edge effects of the coin configuration 530. The top surface of the coin configuration 530 and the bottom surface of the driver coil 500 are separated by a lift-off dimension $z_1$.

In another aspect, a pickup coil 520 has a center axis 510, height ($z_4$-$z_3$), inner radius, $r_3$, outer radius, $r_4$, wherein the outer radius $r_4$ is greater than the outer radius c of a coin configuration 530. The bottom surface of the coin configuration 530 and the top surface of the pickup coil 500 are separated by a lift-off dimension ($z_3$-$d_4$).

The coin configuration 530 itself can comprise a non-homogeneous first layer 540, a homogeneous second layer 550, and a homogeneous third layer 560. First layer 540 is itself comprised of concentric first and second materials 544 and 546 having a height of $d_2$, and an inner radius $c_1$. Each of the first and second materials 544 and 546 can have inherent properties of relative permeability $\mu_{r1e}$ and $\mu_{r1c}$ respectively. Each of the first and second materials 544 and 546 also have inherent properties of conductivity $\sigma_{1e}$ and $\sigma_{1c}$ respectively. Second layer 550 is itself comprised of a homogeneous material 554 having a height of ($d_3$-$d_2$), and has an inherent property of relative permeability $\mu_{r2}$ and conductivity $\sigma_2$. Similarly, third layer 560 is itself comprised of a homogeneous material 564 having a height of ($d_3$-$d_4$), and has an inherent property of relative permeability $\mu_{r3}$ and conductivity $\sigma_3$.

The driver and pickup coil 500 and 520 can be coupled in different ways. For example, in one embodiment, the driver and pickup coil 500 and 520 can be coupled in series. In this configuration, in the absence of having coin configuration 530 disposed between driver and pickup coil 500 and 520, the impedance can be expressed according to the following equation:

$$Z_0 = Z0_1 + Z0_2 \pm 2 \cdot Z0_{1/2} \quad \text{(Equation 25)}$$

The impedance of the series configuration changes in the presence of the coin configuration 530 according to the following equation:

$$Z_c = Z0_1 + \Delta Z_1 + Z0_2 + \Delta Z_2 \pm 2 \cdot Z_{1/2} \quad \text{(Equation 26)}$$

While the aforementioned equations are directed towards a series coupled driver/pickup dual-coil configuration, it should be understood that many other configurations can be used without departing from the spirit and scope of the present disclosure. For example, it is possible to connect more than two coils in series or in parallel. It is also possible to couple the coils in different ways such as, but not limited to, in parallel. For example, in the absence of having coin configuration 530 disposed between driver and pickup coil 500 and 520, the impedance of the parallel, dual-coil configuration, can be expressed according to the following equation:

$$Z_0 = \frac{zo_1 \cdot zo_2 - zo_{1/2}^2}{zo_1 + zo_2 \mp 2 \cdot zo_{1/2}} \quad \text{(Equation 27)}$$

In the presence of having coin configuration 530 disposed between driver and pickup coil 500 and 520, the impedance of the parallel, dual-coil configuration, can be expressed according to the following equation:

$$Z_c = \frac{(zo_1 + \Delta z_1) \cdot (zo_2 + \Delta z_2) - z_{1/2}^2}{zo_1 + \Delta z_1 + zo_2 + \Delta z_2 \mp 2 \cdot z_{1/2}} \quad \text{(Equation 28)}$$

In the absence of the coin configuration 530, the mutual impedance between the two coils $Z0_{1/2}$, of either of the series or parallel configurations, can be expressed according to the following equation:

$$Z0_{1/2} = \frac{j\omega N_1 N_2 \mu_0}{(r_2 - r_1)(z_2 - z_1)(r_4 - r_3)(z_4 - z_3)} \chi(k^T r_3, k^T r_4) (e^{-kz_1} - e^{-kz_2}) K^{-7} E^{-1} \cdot (e^{kz_4} - e^{kz_3}) \chi(kr_1, kr_2) \quad \text{(Equation 29)}$$

In the presence of the coin configuration 530, the mutual impedance between the two coils $Z_{1/2}$, of either of the series or parallel configurations, can be expressed according to the following equation:

$$Z_{1/2} = \frac{j\omega N_1 N_2 \mu_0}{(r_2 - r_1)(z_2 - z_1)(r_4 - r_3)(z_4 - z_3)} \chi(k^T r_3, k^T r_4) (e^{kz_4} - e^{kz_3}) K^{-3} T_{III/III} E^{-1} K^{-4} \cdot (e^{-kz_1} - e^{-kz_2}) \chi(kr_1, kr_2) \quad \text{(Equation 30)}$$

It should be noted that the closed-form analytical solutions disclosed herein can be applied to different coil geometries without departing from the spirit and scope of the present disclosure. For example, in some embodiments, the closed-form analytical solutions disclosed herein can be applied to a cylindrical planar coil geometry. In one aspect, referring to FIG. 22, a planar coil 2100 can comprise a first layer, 2102 and a second layer 2104, wherein layers 2102 and 2104 are separated by a distance ($z_{12}$-$z_{11}$). In some embodiments, the layer separation can be carried out by an isolant which has the similar electric and magnetics characteristics to that of air. In some embodiments, such as the one shown in FIG. 22, the two layers can have identical radii, and number of turns, and can be connected in series. However, it should be noted that the planar coil 2100 can have layers having different number of turns and radii, and can be connected in different ways without departing from the spirit and scope of the present disclosure.

Figure 22:
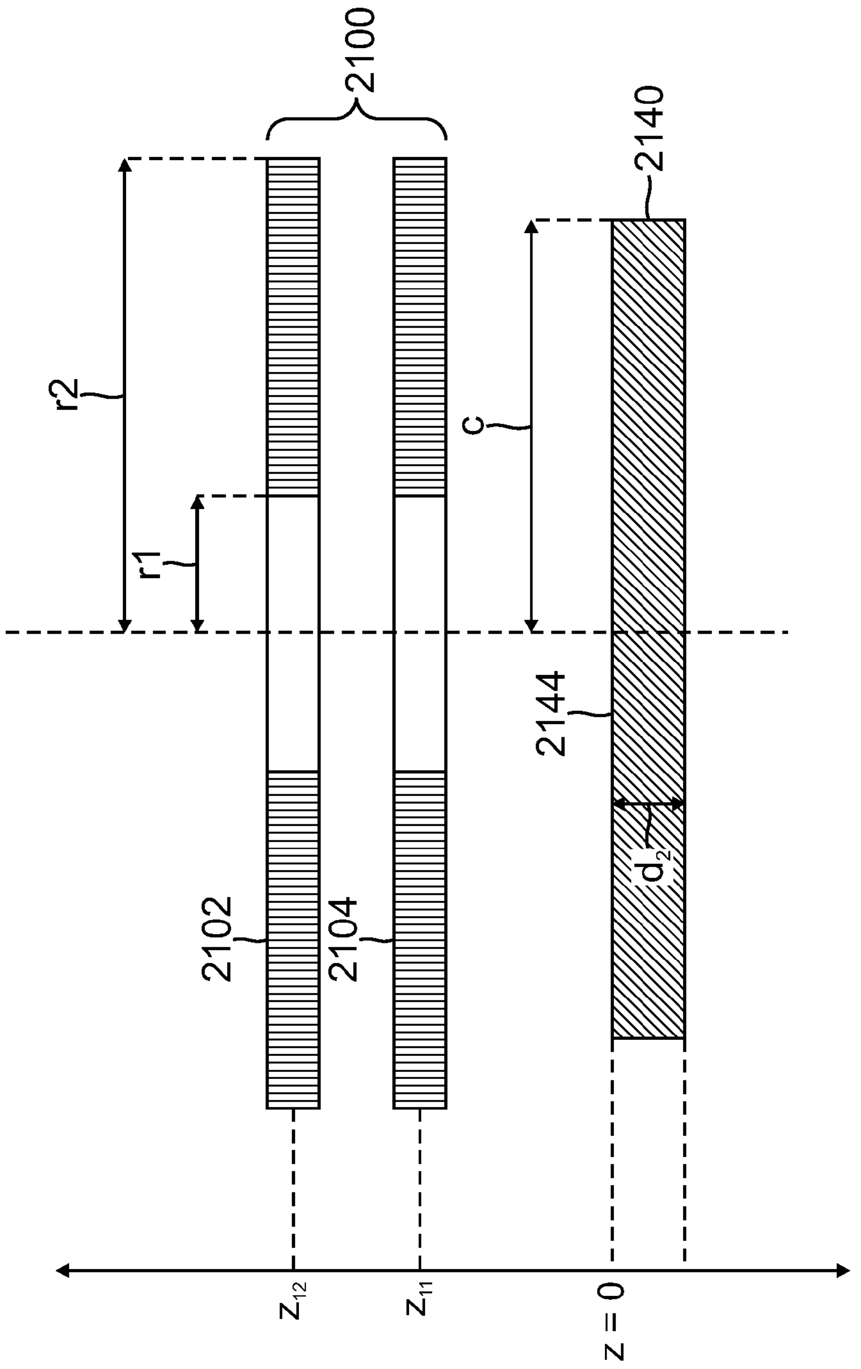
FIG. 22 is a cross-sectional view of a planar coil brought into proximity to a coin configuration according to an embodiment.

As shown in FIG. 22, coin configuration 2130 comprises a single layer 2140 of material 2144 having a permeability, conductivity, radius c, and height $d_2$.

In this implementation, the mutual impedance in air can be expressed according to the following equation:

$$Z_{l1/l2} = \frac{j\pi\omega\mu_0 N^2}{(r_2 - r_1)^2} \chi(k^T r_1, k^T r_2) e^{-kz_{l2}} e^{kz_{l1}} K^{-5} E^{-1} \chi(kr_1, kr_2) \quad \text{(Equation 31)}$$

The mutual impedance change caused by the presence of the coin configuration can be expressed according to the following equation.

$$Z_{l1/l2} = \frac{j\pi\omega\mu_0 N^2}{(r_2 - r_1)^2} \chi(k^T r_1, k^T r_2) K^{-2} e^{-kz_{l2}} E^{-1} R_{0/1s} e^{kz_{l1}} K^{-3} \chi(kr_1, kr_2) \quad \text{(Equation 32)}$$

It should be noted that while the embodiment shown in FIG. 22 comprises a two-layer planar coil configuration, one skilled in the art would appreciate that Equations 31 and 32 can be extended to coils having more or less than two layers without departing from the spirit and scope of the present disclosure. One skilled in the art would also appreciate that Equations 31-32 can be combined with other previous disclosed equations to provide a solution for multi-layer coin configurations.

Moreover, it should be clear to one of skill that equations 1-32 disclose an analytical solution to determining an influence of a coin configuration on the measurement signals output by a coin sensor in the presence of a coin configuration, without the need for a physical coin sample.

Moreover, it should be clear that the analytical solution accounts for edge effects of the coin configuration on the influence to the coin sensor measurement signals. For example, the analytical solution has been applied to coil/coin configurations specified according to the parameters in Table 2.

TABLE 2

| Coil Parameters | | Coin Parameters (c = 5 mm, 8 mm) | | | | |
|---|---|---|---|---|---|---|
| | | Layer | Material | σ (MS/m) | $\mu_r$ | Thickness (mm) |
| $r_1$ | 4 mm | 1 | Zinc | 18.7 | 1 | 0.1 |
| $r_2$ | 6 mm | 2 | Copper | 2.6 | 1 | 0.2 |
| $z_2$-$z_1$ | 4 mm | 3 | Steel | 6.206 | 200 | 2 |
| $z_1$ | 0.5 mm | 4 | Copper-Nickel | 2.6 | 1 | 0.2 |
| N | 200 | 5 | Zinc | 18.7 | 1 | 0.1 |

Figure 20:
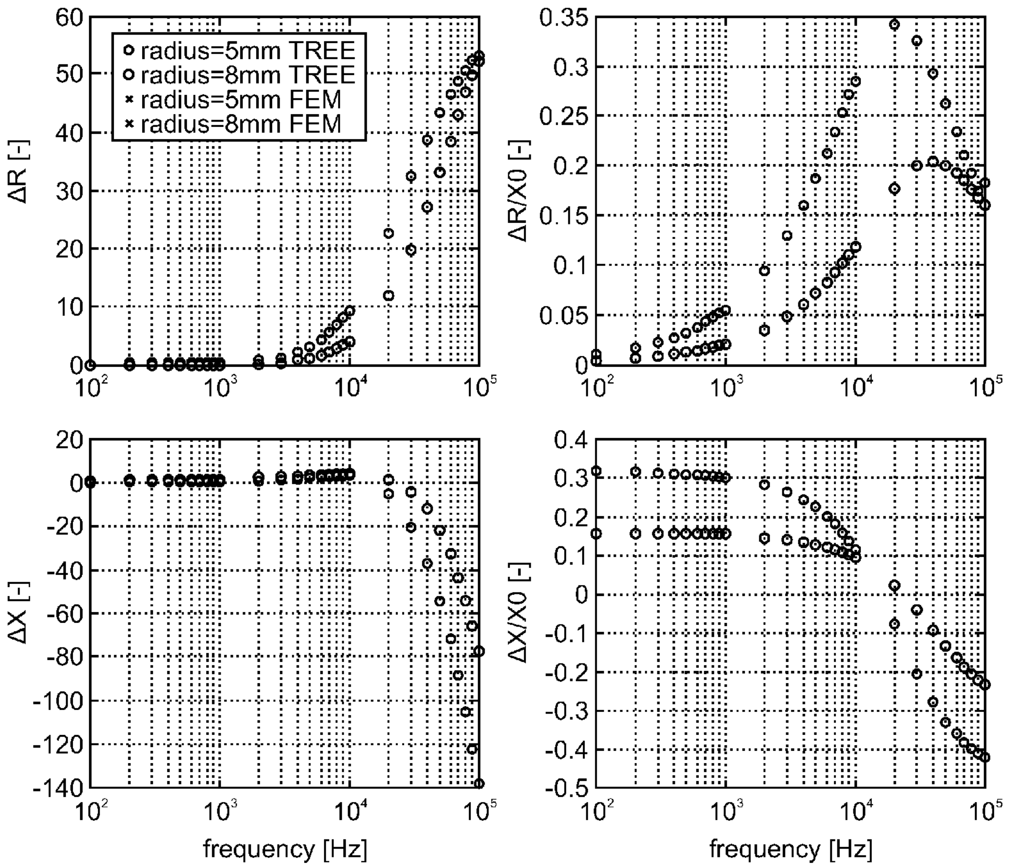
FIG. 20 illustrates the accuracy of accounting for edge effects using an impedance model according to an embodiment.
Figure 21:
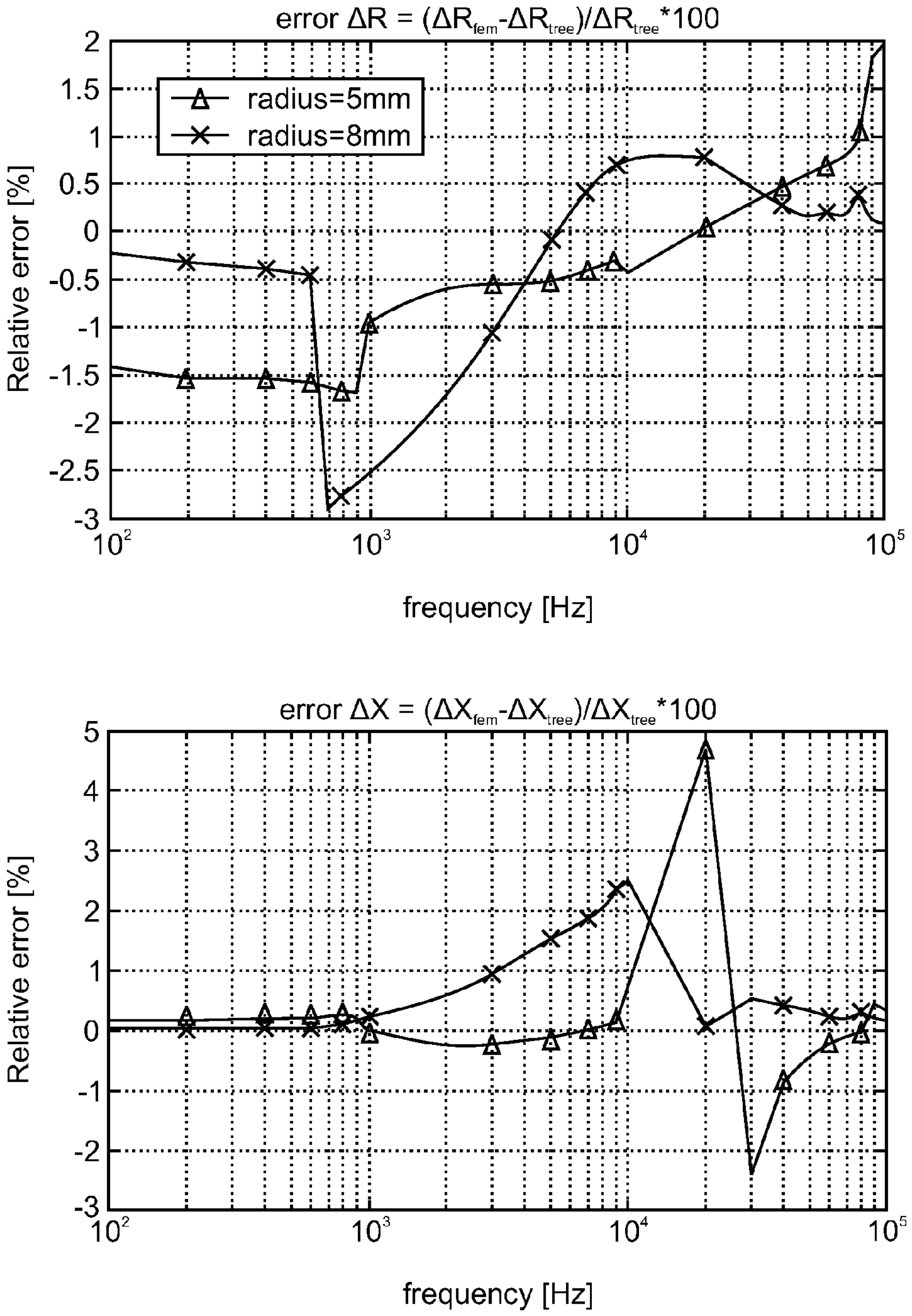
FIG. 21 illustrates the accuracy of accounting for edge effects using an impedance model according to an embodiment.

The expected influence of the coin configurations on the coil of Table 1 was computed using both FEM (Finite Element Modeling) and the analytical solutions disclosed herein. As shown in FIGS. 20-21, the accuracy of the closed-form analytical solutions or equations disclosed herein closely track, and in some instances outperform, FEM in accounting for edge-effects of the conductor on the influence to the coin sensor measurement signals.

Moreover, the equations can be used to program a simulation application that facilitates the rapid characterization of various coil/coin configurations. For example, one skilled in the art would appreciate various high-level languages, such as but not limited to Matlab, Mathematica, Octave, C++, C, C#, Java, or any combination thereof can be used to program a simulation application using the aforementioned equations.

In one aspect, the aforementioned equations can be used to program a computer implemented method of simulating an influence of a coin on a field generated by a coin sensor. However, it should be noted that that while the forthcoming discussion is directed towards implementing a computer implemented method, the method can be embodied various formats. For example, any part or all of the forthcoming steps can be embodied in a non-transitory computer-readable medium having computer-executable instructions for performing the described method and steps without departing from the spirit and scope of the present disclosure. However, it should be appreciated that the forthcoming steps can also be embodied in a transitory computer-readable medium having computer-executable instructions for performing the described method and steps without departing from the spirit and scope of the present disclosure.

Figure 8:
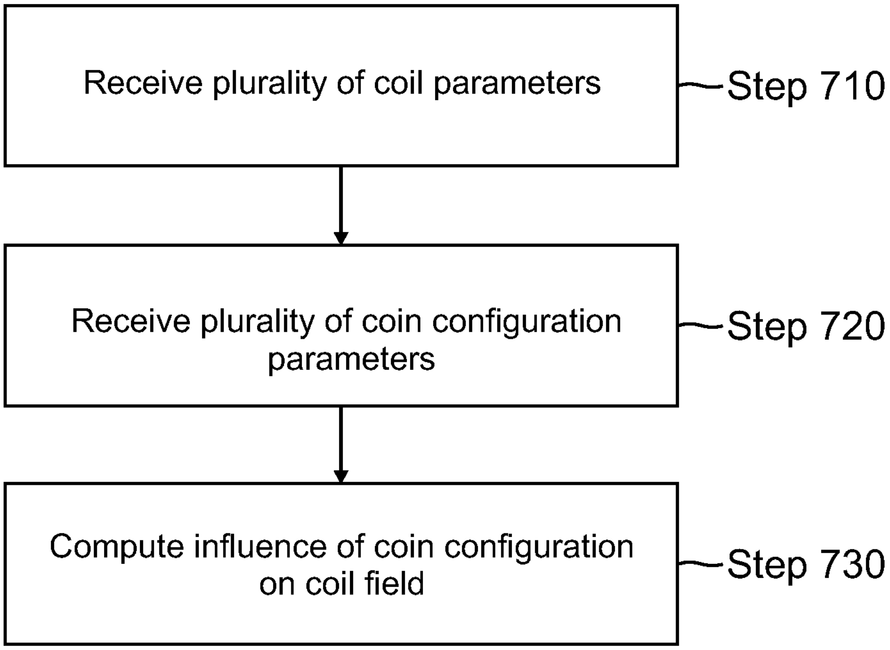
FIG. 8 is a flowchart illustrating the simulation of an influence of a coin configuration on a field generated by a coil according to an embodiment.
Figure 9:
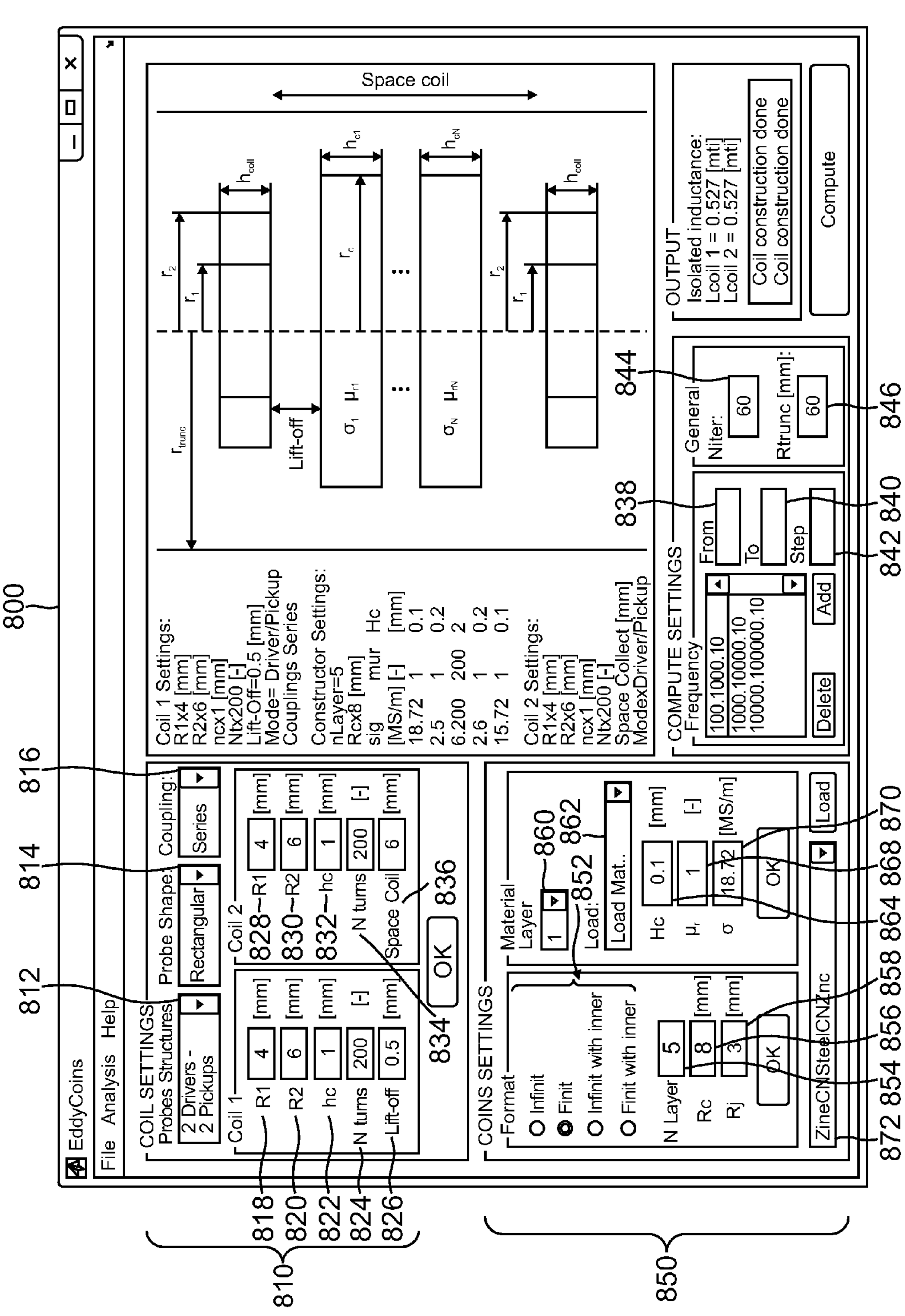
FIG. 9 is a graphical user interface of a computer program that is configured to simulate influence of a coin configuration on a field generated by a coil according to an embodiment.

For example, as shown in FIGS. 8 and 9, a processor receives a one or more coin configuration and coil parameters in steps 710-720. A graphical user interface (GUI) 800 can be configured to receive one or more of coin configuration and coil parameters 810 and 850. Based on the received parameters and the equations disclosed in the preceding section, the processor computes the influence of the coin configuration on a field generated by the coin sensor, as shown in step 730.

For example, referring FIG. 9, a coil parameters can be input into a GUI, such as but not limited to arrangement 812, geometry 814, coupling 816, driver inner radius 818, driver outer radius 820, driver height 822, driver number of turns 824, driver lift-off 826, pickup inner radius 828, pickup outer radius 830, pickup height 832, pickup number of turns 834, the spacing in between the pickup coil and the coin configuration 836, start excitation frequency 838, stop excitation frequency 840, step excitation frequency 842, or any combination thereof. The processor can be configured to receive at least one of such coin configuration parameters.

In another aspect, coin configuration parameters can be input into a GUI, such as but not limited to, the number of layers 854, outer radius, 856, inner radius 858, layer number 860, layer material 862, layer height 864, layer relative permeability 868, layer conductivity 870, preset configuration 872, or any combination thereof. In some embodiments, the general simulation parameters can also be input into a GUI, such as the number of eigenvalues 844, a truncation radius 846, or any combination thereof. The processor can be configured to receive at least one of such coil parameters.

In some aspects, the GUI can be configured to receive as input, an external file specifying coil parameters, coin configuration parameters or any combination thereof. In some designs, the processor can be configured to scan the received file for coil parameters or coin configuration parameters, and populate the appropriate GUI fields accordingly. In some embodiments, the external file can comprise various formats, such as but not limited to text, document, portable document format, rich text format, comma separated values, tabular (e.g., ".xls"), html, xml, or any combination thereof. In some aspects, the processor can be configured to communicate with a database such as but not limited to relational databases, non-relational databases, or any combination thereof. In one design, the processor can be configured to query the database for coil and/or coin configuration parameters, and populate the appropriate GUI fields, based upon a selection of a preset coil/and or coin configuration by an end user.

However, it should be noted that the GUI can comprise other coin configuration and/or coil parameters, and other coin configuration and/or coil configuration parameters can be received by the processor without departing from the spirit and scope of the present disclosure. For example, in one aspect, the coil parameters can also comprise temperature. In yet a further aspect, the coil parameters can include drive signal parameters of the coil such as but not limited to fill-factor, excitation signal type, excitation signal shape, excitation frequency, rise time, fall time, dead time, voltage, current, simulation step frequency, or any combination thereof. In some implementations, tolerances of a coil configuration can be provided as a coil parameter, such as but not limited to tolerance in height, inner radius, outer radius, lift-off, material, number of turns, voltage, current, frequency, rise time, fall time, or any combination thereof. In some implementations, tolerances of a coin configuration can be provided as a coin configuration parameter, such as but not limited to tolerance in height, radii, permeability, conductivity, material, homogeneity, or any combination thereof.

In some implementations, the processor can be configured to express different aspects of the influence of the coin configuration parameters on the coin sensor measurement signals. For example, the processor can be configured to express the influence as a change in coil impedance over frequency, a change in relative coil impedance over frequency, coil impedance over frequency, relative coil impedance over frequency, mutual impedance over frequency, or any combination thereof. In some aspects, the influence can also be expressed in different ways, such as but not limited to interactive graphs, non-interactive graphs, statistical charts, numerical representations, tabular representations, or any combination thereof.

In one aspect, the processor can be configured to express the influence of the coin configuration parameters on the coil as a representation of the eddy currents that are induced in each layer of the coin configuration. For example, with respect to a homogeneous layer, the eddy current density induced in the $j^{th}$ layer can be expressed according to the following equation:

$$J_{\Phi_j}(r, z) = -j\frac{1}{2}\frac{\omega\sigma_j\mu_0 NI}{(r_2 - r_1)(z_2 - z_1)} J_1(q_j^T r)R_1(p_j c)\left(e^{p_j z} + e^{-p_j z}R_{j/j+1}\right)T_{j/j-1}C \quad \text{(Equation 33)}$$

With respect to a non-homogeneous layer, the eddy current density induced in the $j^{th}$ layer can be expressed according to the following set of equations:

$$J_{\Phi_j}^{(c)}(r, z) = -j\frac{1}{2}\frac{\omega\sigma_{j_c}\mu_0 NI}{(r_2 - r_1)(z_2 - z_1)} J_1(q_j^T r)R_1(p_j c_2)\left(e^{p_j z} + e^{-p_j z}R_{j/j+1}\right)T_{j/j-1}C \quad \text{(Equation 34)}$$

-continued $$J_{\Phi_j}^{(e)}(r,z) = -j\frac{1}{2}\frac{\omega\sigma_{j_e}\mu_0 NI}{(r_2-r_1)(z_2-z_1)} L_1(s_j^T r)R_1(p_j c_2)\left(e^{p_j z} + e^{-p_j z}R_{j/j+1}\right)T_{j/j-1}C \quad \text{(Equation 35)}$$

Thus, it should be clear to one skilled in the art that the aforementioned equations can be used to program an application which expresses the influence of the coin configuration parameters on the coil as a representation of the eddy currents that are induced in each layer of the coin configuration.

Figure 10:
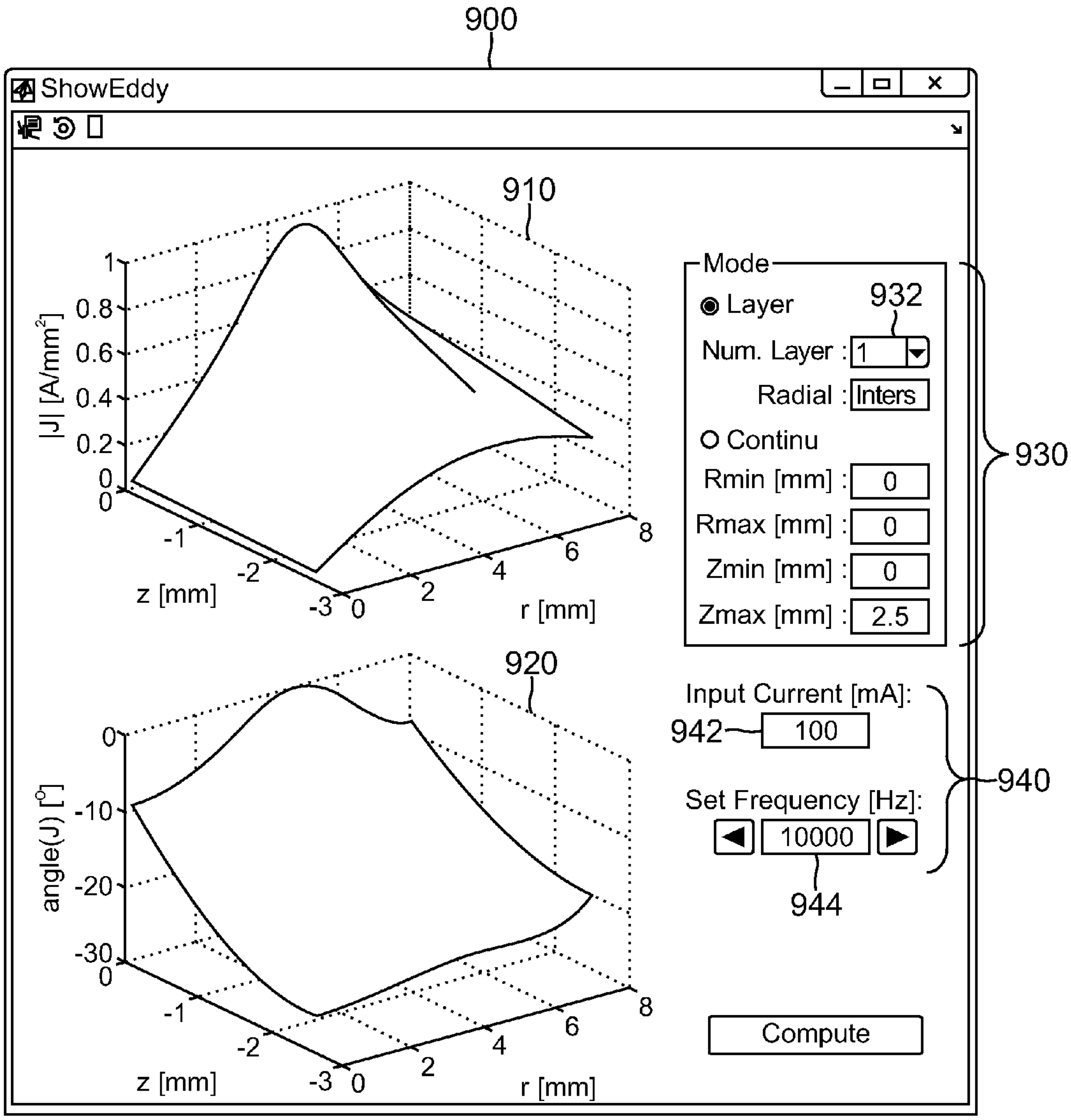
FIG. 10 is a graphical user interface of a computer program that is configured to visualize the induced eddy current density in each layer of a multi-layer coin configuration according to an embodiment.

For example, in some implementations, such as the GUI 900 shown in FIG. 10, the processor is configured to compute magnitude and angle plots 910 and 920 of the current density. In some implementations, the GUI 900 can comprise controls 930 which can be used to facilitate user interaction by way of manipulation of plot axes. In some embodiments, as shown in the figure, the controls 930 can contain a selection control 932, which is configured to receive as input a selected layer number from an end-user. The processor can be configured to receive the selected layer number from the selection control 932 and compute the current density magnitude and angle plots 910 and 920 of the selected layer. In other aspects, the can GUI 900 can also contain controls 940 to modify the coil parameters. For example, control 940 can comprise an input current control 942, a frequency control 944, or any combination thereof. Current and frequency controls 942 and 944 can be configured to receive user input, and to pass the received input to the processor for re-computation of the resultant eddy current density plots 910 and 920.

However, it should be understood that while the illustrated controls 940 are configured to adjust the input current and frequency, other coil/coin configuration parameters can be adjusted using the GUI 900 without departing from the spirit and scope of the present disclosure. It should also be noted that other types of controls and other control functions can be included in the GUI without departing from the spirit and scope of the present disclosure. For example, additional controls can be added to control tolerances, dimensions, material properties, or any combination thereof.

Figure 11:
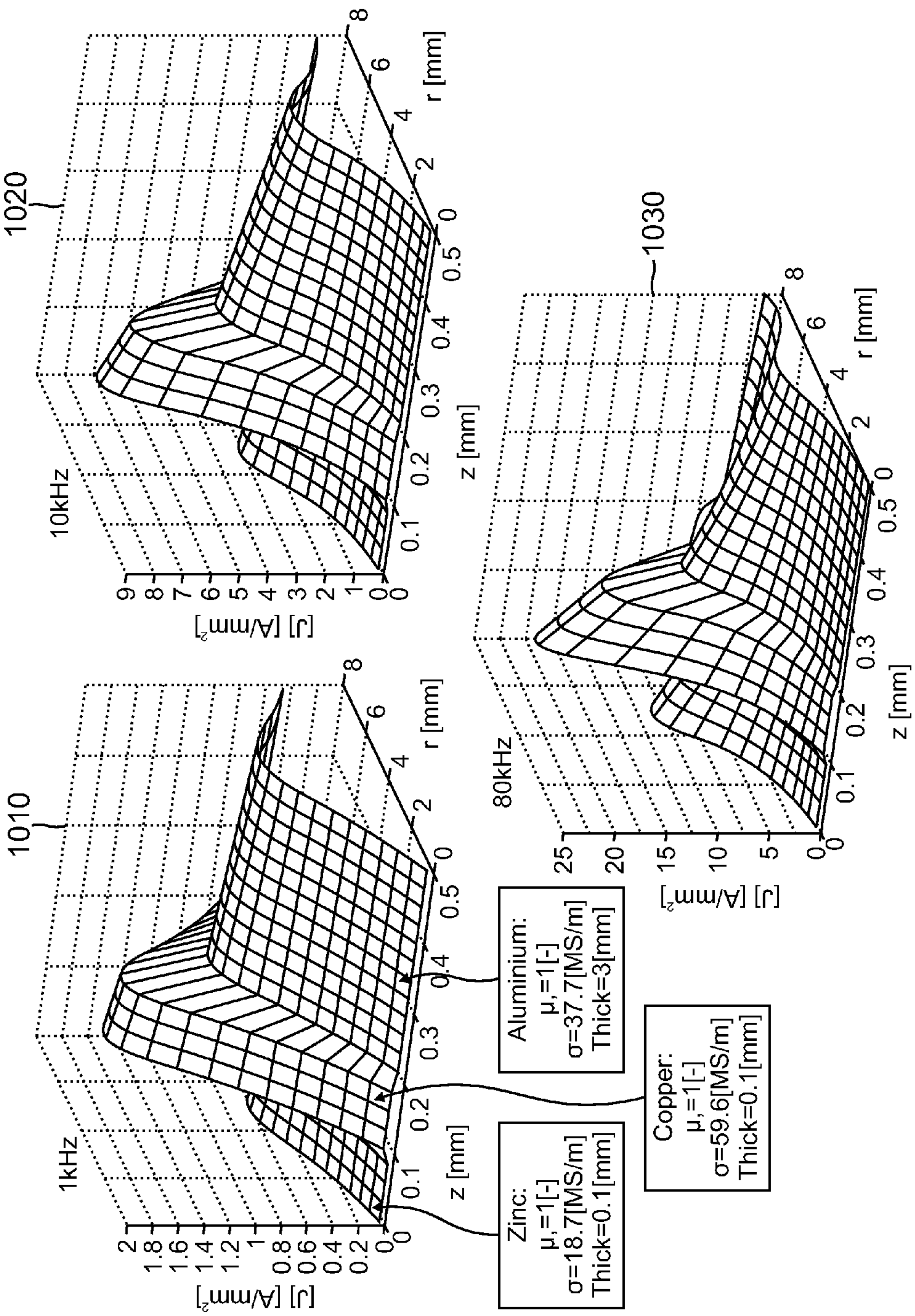
FIG. 11 is a graphical representation of the current density in each layer of a multi-layer coin configuration, computed at 1 kHz, 10 hHz, and 80 kHz, according to an embodiment.
Figure 12:
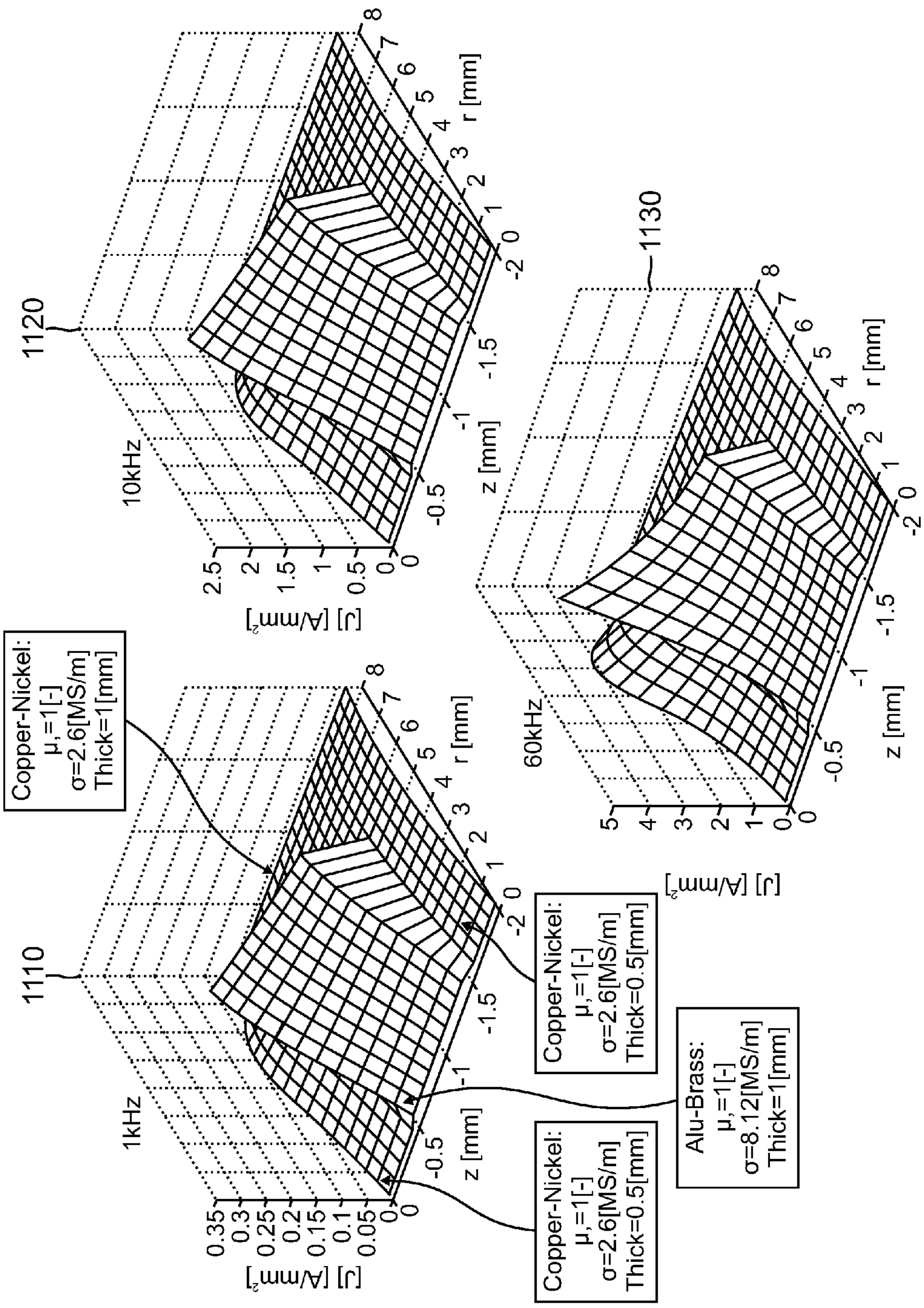
FIG. 12 is a graphical representation of the current density in each layer of a multi-layer coin configuration, computed at 1 kHz, 10 hHz, and 60 kHz, according to an embodiment.
Figure 13:
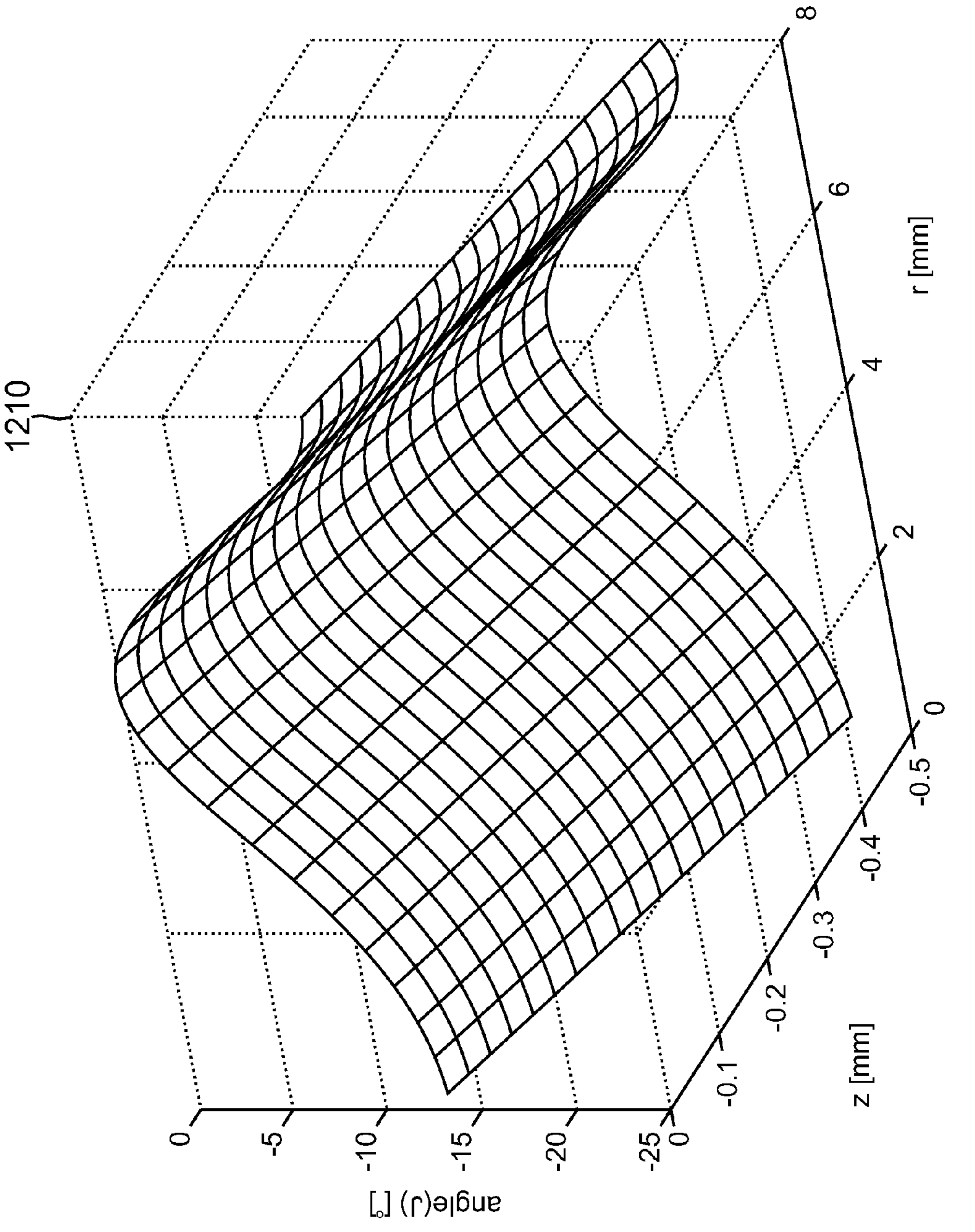
FIG. 13 is a graphical representation of the angular component of the 1 kHz current density magnitude graph shown in FIG. 11 according to an embodiment.

It should also be noted that while the processor can be configured to plot the eddy current density profile of each layer individually, the processor can also be configured to display the eddy current density profile of an overall multilayer coin configuration on a single plot. For example, as shown in FIGS. 11-12, each plot comprises the magnitude of the eddy current density profile of a multi-layer coin. It should also be noted that the processor can be configured to compare the current density profiles of a single coin at different frequencies. For example, FIG. 11 illustrates a the eddy current density profile Zinc-Copper-Aluminum coin configuration at 1 kHz, 10 kHz, and 80 kHz. In some implementations, the processor can be configured to plot the angle of the overall eddy current density profile for a given multi-layer coin configuration. For example, referring to FIG. 13, the angle of the overall eddy current density profile corresponding to the eddy current density magnitude plot 1010 of FIG. 11 is plotted in plot 1210.

In some embodiments, the processor can also be configured to compute the discrimination performance of a coin sensor as between a specified coin configuration and a reference dataset. Various techniques can be used to compute the discrimination performance, such as but not limited to linear discriminant analysis.

Figure 14:
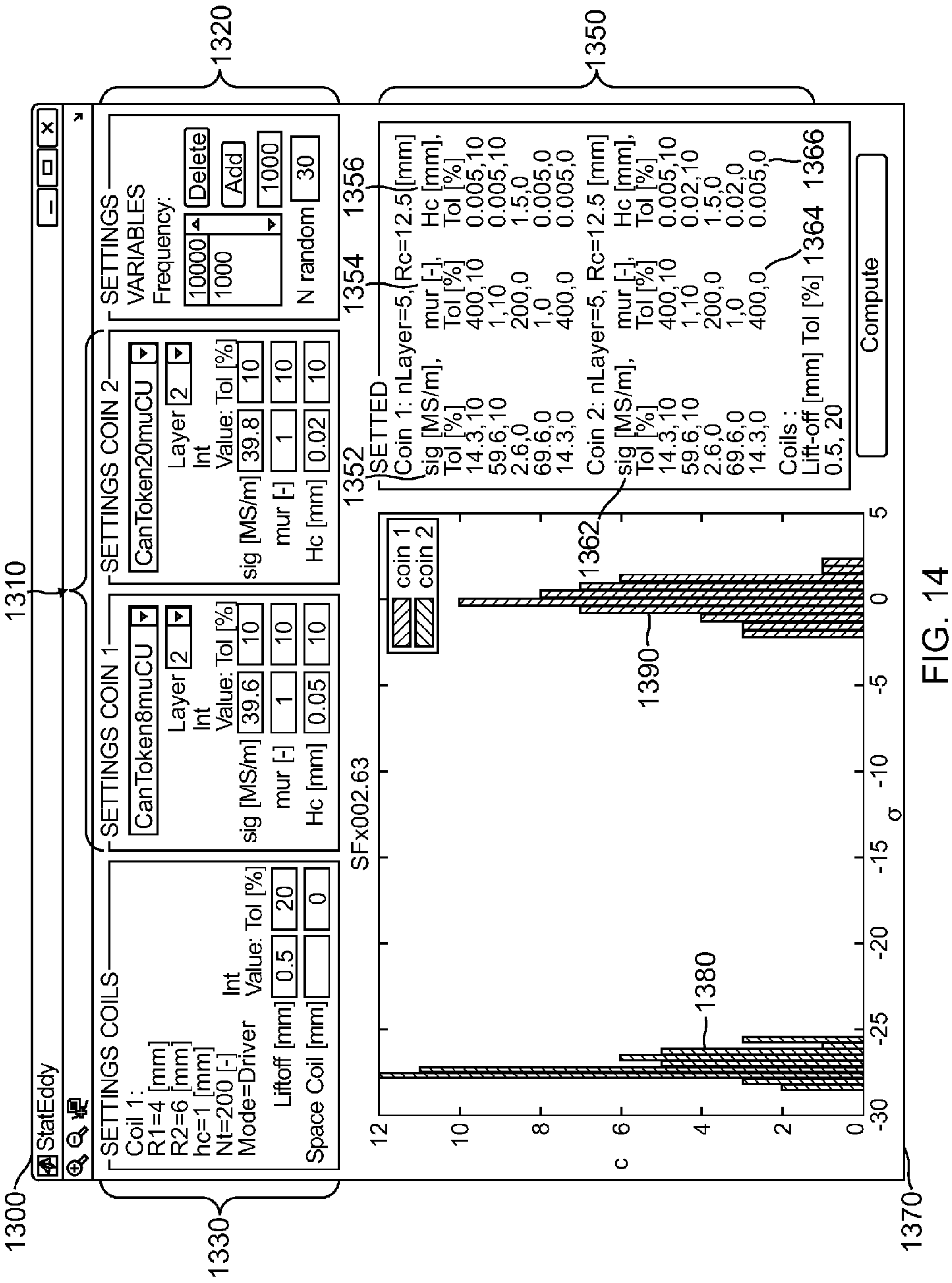
FIG. 14 is a graphical user interface of a computer program that is configured to perform tolerance and discrimination analysis according to an embodiment.

In some aspects, as shown in FIG. 14, a GUI 1300 can be programmed to facilitate visualization of coil/coin configuration discrimination performance. As shown in the figure, controls 1310-1330 can be provided to load in various coin configurations, tolerances, and settings.

In the embodiment shown in the FIG. 14, the coin configuration settings 1310 can include layer conductivity tolerance, layer permeability tolerance, layer height tolerance, or any combination thereof. For example, the configured settings for each layer of a first and second five-layer coin configuration are displayed in indicator 1350 and 1360. It should be noted that in addition to the coin configuration settings shown in FIG. 14, the GUI can be configured to receive other coin configuration parameter tolerances without departing from the spirit and scope of the present disclosure.

As shown in FIG. 14 coil settings can include the inner radius, outer radius, number of turns, number of coils, coupling, or any combination thereof. However, it is to be understood that the GUI can also include other coil parameters without departing from the spirit and scope of the present disclosure.

Simulation setting controls 1320 can also be provided to adjust the frequency region of interest. In some implementations, the processor can be configured to compute a plot 1370 representing the number of standard deviations a between the classification of first and second coin configurations 1380 and 1390. In some implementations, the reference dataset can comprise the configuration of an actual coin. However, it should be understood that the reference dataset can also comprise the configuration of a counterfeit, hypothetical coin configuration, or any combination thereof. This can be an especially useful tool in the design of coins, where it is desirable to determine whether a particular coin configuration will provide sufficient discrimination with respect to known counterfeits prior to sending the coin configuration out for fabrication.

Figure 15:
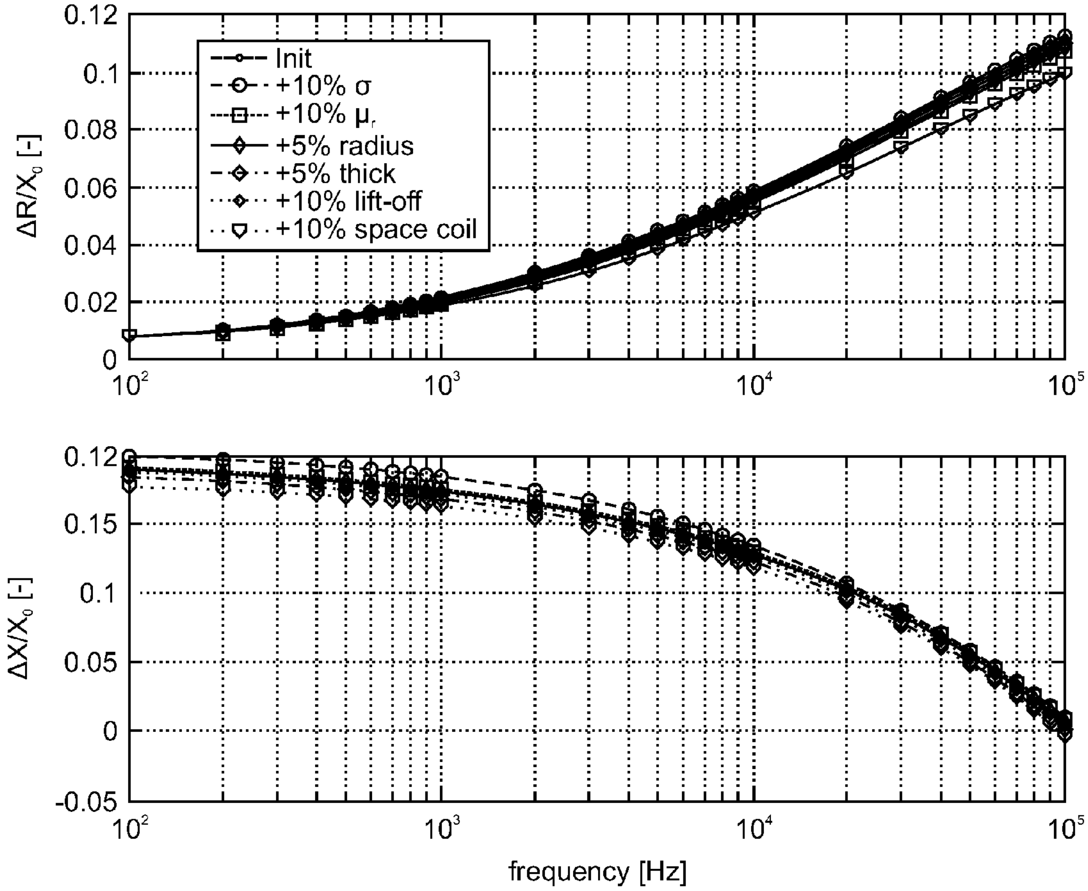
FIG. 15 is a plot of the effect of parameter tolerance on coin sensor impedance over frequency according to an embodiment.
Figure 16:
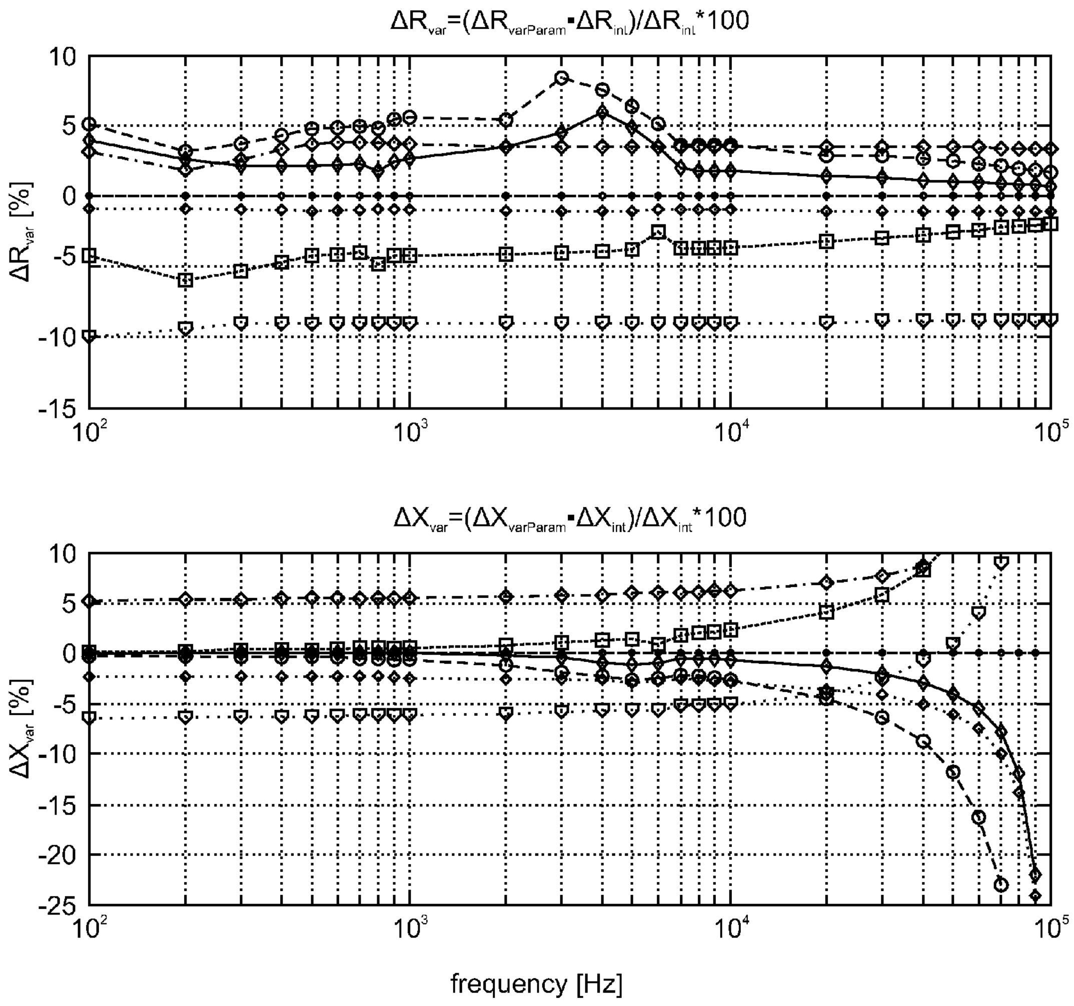
FIG. 16 is a plot of FIG. 15 expressed as a percentage.
Figure 17:
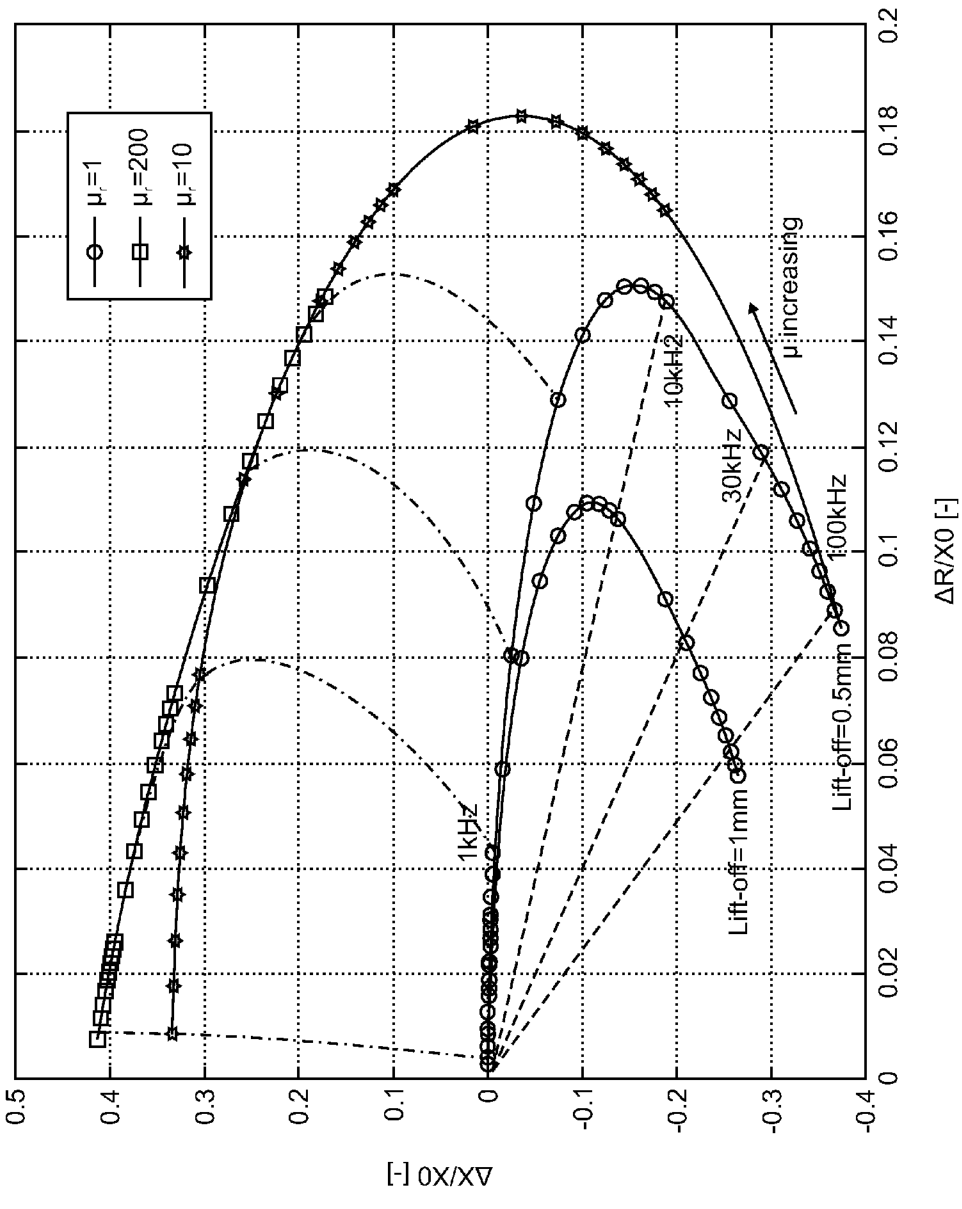
FIG. 17 is a normalized impedance plane diagram generated by a computer program according to an embodiment.

As discussed in the preceding sections, tolerances can be received by the processor as coil parameters, coin configuration parameters, or any combination thereof. The processor can be configured to compute an analysis of any of the aforementioned representations over the defined tolerance parameters, such as but not limited to a monte carlo analysis. In some aspects, as shown in FIGS. 15-16, the processor can be configured to compute plots representing the effect of coil and/or coin configuration parameter tolerance on the influence to coil measurement signals by the coin configuration. In some designs, as shown in FIG. 17, the processor can be configured to express the parameter variation in the form of a normalized impedance plane.

In some designs, the processor can be configured to receive a discrimination performance specification and compute an optimal coin configuration. For example, the processor can be configured to receive a reference coin configuration specification, and a discrimination performance specification. In some embodiments, a GUI can be configured to allow an end user to specify the discrimination performance specification as a number of standard deviations relative to the reference coin configuration. However, it should be noted that the discrimination performance specification need not be specified using a number of standard deviations. For example, in one embodiment, the discrimination performance specification can also be specified using other parameters such as but not limited to impedance separation at a frequency or set of frequencies of interest. In some aspects, the GUI can also be configured to receive a set of constraints with respect to the optimal coin configuration design, such as but not limited to materials, thickness, radius, homogeneity, permeability, conductivity, or any combination thereof.

Referring back to FIG. 1, it should now be clear that model of a coin sensor 10 which represents an expected influence of a coin configuration on the measurement signal can be computed in the absence of having a physical sample of the coin, and can be stored on the computer readable storage medium 30 for processing during operation of the coin tester 1. It should also be clear that the processor 20 can be configured to compute a coefficient of the model in the presence of a coin.

For example, in one implementation, prior to storage of the model on the storage medium 30, the tolerance of each model coefficient can be computed at each frequency for a given coin configuration. The coefficient tolerance vectors and the model can then be stored on the computer-readable storage medium 30. During operation of the coin tester, during or after a coin has been brought into proximity to the coin sensor 10, the processor 20 can receive the measurement signal, and use the measurement signal data, model, digitized driving signal data, or any combination thereof to compute a coefficient of the model. In some implementations, the computation of the model coefficient can be bounded a range that is defined by coefficient tolerance vector that was previously computed and stored on the storage medium 30.

Although the discussion above focuses on an exemplary coin tester, as noted earlier, the method and apparatus are readily adapted for use with other items of currency having a metallic security feature. Any type of such item of currency can be used, including but not limited to paper money, checks, cards, other bill forms, etc. In such instances, rather than relying on gravity to transport a coin along a coin path, a bill transport can be provided for accepting and transporting the item of currency to and through the tester, in this case, a currency tester. In some embodiments, both a coin tester and a currency tester can be employed in a single machine. In other embodiments, a single tester can be adapted for both coins and bills. Such a combination system advantageously saves coveted space in a money handling apparatus.

The coin tester apparatus and methods described herein are illustrative in nature and are not meant to be limiting in any way. Those of skill in the art will appreciate variations which do not deviate from the scope and spirit of the disclosure herein, which are encompassed by this disclosure.

What is claimed is:

1. A coin tester apparatus comprising:

a broadband signal generator configured to output a driving signal;

a coin sensor coupled to said driving signal, said coin sensor configured to output a measurement signal in response to said driving signal, wherein said measurement signal is configured to be influenced by the presence of a coin;

a computer-readable storage medium configured to store an impedance model of said coin sensor, said impedance model representing an expected influence of at least one coin configuration parameter on said measurement signal; and a processor configured to compute a coefficient of said model in the presence of said coin and apply acceptance criteria to said coefficient to determine whether said coin falls within a predetermined coin classification.

2. The coin tester apparatus of claim 1 wherein said driving signal comprises a pseudorandom sequence.

3. The coin tester apparatus of claim 1 wherein said driving signal comprises a pseudorandom pulse train.

4. The coin tester apparatus of claim 1 wherein said measurement signals represent an effect of inducing eddy currents in said coin.

5. The coin tester apparatus of claim 1 wherein said measurement signal comprises a digital signal.

6. The coin tester apparatus of claim 1 wherein said coin sensor comprises a coil.

7. The coin tester apparatus of claim 6 wherein said coin configuration radius is less than said coil radius.

8. The coin tester apparatus of claim 6 wherein said impedance model accounts for edge effects of said coin configuration on said expected influence to said measurement signals.

9. The coin tester apparatus of claim 1 wherein said coin sensor comprises a driver coil and a pickup coil.

10. The coin tester apparatus of claim 1 wherein said storage media comprises a non-volatile memory device coupled to said processor.

11. The coin tester apparatus of claim 1 wherein said impedance model is initially computed in the absence of having a physical coin sample.

12. The coin tester apparatus of claim 1 further comprising a temperature sensor configured to sense an ambient temperature, wherein said processor is further configured to compute the effect of said ambient temperature on said coefficient.

13. The coin tester apparatus of claim 1 wherein said coin configuration comprises a total number of layers.

14. The coin tester apparatus of claim 1 wherein said at least one coin configuration parameter comprises permeability of a layer.

15. The coin tester apparatus of claim 1 wherein said at least one coin configuration parameter comprises conductivity of a layer.

16. The coin tester apparatus of claim 1 wherein said at least one coin configuration parameter comprises homogeneity of a layer.

17. The coin tester apparatus of claim 1 wherein said predetermined coin classification comprises a non-genuine coin classification.

18. The coin tester apparatus of claim 1 wherein said at least one coin configuration parameter comprises layer material properties.

19. The coin tester apparatus of claim 1 wherein said at least one coin configuration parameter comprises a lift-off dimension between said coil and said coin.

20. A method of testing a coin using a coin tester, the method comprising:

driving a coin sensor using a broadband signal;

obtaining measurement samples from said coin sensor in the presence of a coin, wherein said measurement samples represent an influence of said coin on a field generated by said coin sensor in response to said driving signal;

solving for, via a processor, coefficients of an impedance model of said coin sensor, said impedance model representing an expected influence of at least one coin configuration parameter on said measurement signal;

applying acceptance criteria to said coefficients to determine whether said coin falls within a predetermined classification of coins.

21. The method of claim 20 wherein said broadband signal comprises a pseudorandom sequence.

22. The method of claim 20 wherein said broadband signal comprises a pseudorandom pulse train.

23. The method of claim 20 wherein said measurement samples represent an effect of inducing eddy currents in said coin.

24. The method of claim 20 wherein said measurement samples comprise a digital signal.

25. The method of claim 20 wherein said coin sensor comprises a coil.

26. The method of claim 25 wherein said coin configuration radius is less than said coil radius.

27. The method of claim 25 wherein said impedance model accounts for edge effects of said coin on said coin sensor.

28. The method of claim 20 wherein said coin sensor comprises a driver coil and a pickup coil.

29. The method of claim 20 wherein said storage media comprises a non-volatile memory device coupled to said processor.

30. The method of claim 20 wherein said impedance model is initially computed in the absence of having a physical coin sample.

31. The method of claim 20 further comprising measuring an ambient temperature using a temperature a temperature sensor and computing the effect of said ambient temperature on said coefficient.

32. The method of claim 20 wherein said at least one coin configuration parameter comprises a total number of layers.

33. The method of claim 20 wherein said at least one coin configuration parameter comprises permeability of a layer.

34. The method of claim 20 wherein said at least one coin configuration parameter comprises conductivity of a layer.

35. The method of claim 20 wherein said at least one coin configuration parameter comprises homogeneity of a layer.

36. The method of claim 20 wherein said predetermined coin classification comprises a non-genuine coin classification.

37. The method of claim 20 wherein said at least one coin configuration parameter comprises layer material properties.

38. The method of claim 20 wherein said at least one coin configuration parameter comprises a lift-off dimension between said coil and said coin.

* * * * *